(12) United States Patent
Maeda et al.

(10) Patent No.: US 10,152,946 B2
(45) Date of Patent: Dec. 11, 2018

(54) VIDEO DISPLAY METHOD USING VISIBLE/VISUAL LIGHT COMMUNICATION WITH STRIPE PATTERNS HAVING DIFFERENT ORIENTATIONS AND COLOR COMBINATIONS

(71) Applicant: PANASONIC CORPORATION, Osaka (JP)

(72) Inventors: Toshiyuki Maeda, Kanagawa (JP); Akihiro Ueki, Kanagawa (JP); Takashi Suzuki, Osaka (JP); Akira Shiokawa, Osaka (JP); Koji Aoto, Hyogo (JP); Koji Nakanishi, Kanagawa (JP); Hideki Aoyama, Osaka (JP); Mitsuaki Oshima, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 169 days.

(21) Appl. No.: 15/053,925

(22) Filed: Feb. 25, 2016

(65) Prior Publication Data
US 2016/0180810 A1    Jun. 23, 2016

Related U.S. Application Data

(63) Continuation of application No. PCT/JP2014/004973, filed on Sep. 29, 2014.

(30) Foreign Application Priority Data

Sep. 30, 2013 (JP) .................................. 2013-203349

(51) Int. Cl.
*G06T 1/00* (2006.01)
*G09G 5/10* (2006.01)
(Continued)

(52) U.S. Cl.
CPC .............. *G09G 5/10* (2013.01); *G06F 3/1423* (2013.01); *G06T 1/00* (2013.01); *G06T 11/001* (2013.01);
(Continued)

(58) Field of Classification Search
None
See application file for complete search history.

(56) References Cited

U.S. PATENT DOCUMENTS

| 7,570,246 B2 | 8/2009 | Maniam et al. |
| 8,587,680 B2 | 11/2013 | Okumura et al. |

(Continued)

FOREIGN PATENT DOCUMENTS

| JP | 06-051395 A | 2/1994 |
| JP | 2003-115025 A | 4/2003 |

(Continued)

OTHER PUBLICATIONS

Extended European Search Report dated Sep. 14, 2016, issued in corresponding European Application No. 4848998.2.
(Continued)

*Primary Examiner* — Kee M Tung
*Assistant Examiner* — Patrick F. Valdez
(74) *Attorney, Agent, or Firm* — McDermott Will & Emery LLP

(57) ABSTRACT

A display method for appropriately transmitting a visible light communication signal includes: a step of coding a visible light communication signal to generate an image having a striped pattern for visible light communication as a first visible light communication image; a step of displaying the image included in the video signal, in a predetermined frame; and a step of displaying a low-luminance image in the predetermined frame, and sequentially displaying the first visible light communication image, the low-
(Continued)

luminance image being an identification image and having uniform luminance lower than average luminance of the image which is to be displayed, wherein in the step, after the image included in the video signal is displayed in the predetermined frame, each of the first identification image and the first visible light communication image is displayed in a same frame as the predetermined frame, for a period shorter than the predetermined frame.

12 Claims, 22 Drawing Sheets

(51) Int. Cl.
    *H04B 10/116*     (2013.01)
    *H04N 7/025*     (2006.01)
    *G06T 11/00*     (2006.01)
    *G06F 3/14*     (2006.01)
    *G09G 3/20*     (2006.01)
    *G09G 5/02*     (2006.01)

(52) U.S. Cl.
    CPC .............. *G09G 3/20* (2013.01); *G09G 3/2059* (2013.01); *G09G 5/026* (2013.01); *H04B 10/116* (2013.01); *H04N 7/025* (2013.01); *G09G 2370/12* (2013.01)

(56) References Cited

U.S. PATENT DOCUMENTS

| | | | |
|---|---|---|---|
| 8,648,911 | B2 | 2/2014 | Okumura |
| 8,976,279 | B2 | 3/2015 | Tatsuzawa et al. |
| 2004/0125053 | A1* | 7/2004 | Fujisawa ............... G06F 1/1613 345/76 |
| 2007/0024571 | A1 | 2/2007 | Maniam et al. |
| 2009/0135271 | A1 | 5/2009 | Kurane |
| 2009/0219296 | A1* | 9/2009 | Watanabe ................ G09G 5/02 345/589 |
| 2009/0262127 | A1* | 10/2009 | Miyasaka .............. G09G 3/001 345/589 |
| 2010/0085373 | A1* | 4/2010 | Miyasaka ................ G09G 5/00 345/589 |
| 2011/0007160 | A1* | 1/2011 | Okumura .............. G06T 1/0085 348/143 |
| 2011/0007171 | A1* | 1/2011 | Okumura .............. G06T 1/0085 348/211.4 |
| 2012/0211567 | A1* | 8/2012 | Herzig ................. G06K 7/1093 235/488 |
| 2013/0271631 | A1 | 10/2013 | Tatsuzawa et al. |
| 2015/0205984 | A1* | 7/2015 | Jiang ...................... G06K 19/08 235/437 |

FOREIGN PATENT DOCUMENTS

| | | |
|---|---|---|
| JP | 2004-072365 A | 3/2004 |
| JP | 2005-354603 A | 12/2005 |
| JP | 2007-036833 A | 2/2007 |
| JP | 2007-043706 A | 2/2007 |
| JP | 2007-049584 A | 2/2007 |
| JP | 2007-072099 A | 3/2007 |
| JP | 2007-124404 A | 5/2007 |
| JP | 2007-248861 A | 9/2007 |
| JP | 2008-015402 A | 1/2008 |
| JP | 2009-130771 A | 6/2009 |
| JP | 2009-212768 A | 9/2009 |
| JP | 2012-205168 A | 10/2012 |
| JP | 2013-223043 A | 10/2013 |
| WO | 2008/133303 A1 | 11/2008 |
| WO | 2009/113415 A1 | 9/2009 |
| WO | 2009/113416 A1 | 9/2009 |

OTHER PUBLICATIONS

International Search Report dated Dec. 2, 2014, issued in corresponding International Application No. PCT/JP2014/004973. (w/ partial English translation).

* cited by examiner

VIDEO DISPLAY METHOD USING VISIBLE/VISUAL LIGHT COMMUNICATION WITH STRIPE PATTERNS HAVING DIFFERENT ORIENTATIONS AND COLOR COMBINATIONS

CROSS REFERENCE TO RELATED APPLICATIONS

This is a continuation application of PCT International Application No. PCT/JP2014/004973 filed on Sep. 29, 2014, designating the United States of America, which is based on and claims priority of Japanese Patent Application No. 2013-203349 filed on Sep. 30, 2013. The entire disclosures of the above-identified applications, including the specifications, drawings and claims are incorporated herein by reference in their entirety.

FIELD

The present disclosure relates to a display method for displaying an image included in a video signal.

BACKGROUND

Communication techniques using visible light have been proposed. For example, as in Patent Literatures (PTLs) 1 and 2, there are proposals on video display devices such as displays and projectors, to superimpose visible light communication information onto a normal video to be displayed, and display the resulting video.

In addition, there are digital watermark technology which is in pilot use in printed materials and techniques for displaying, in images, QR codes (registered trademark), bar codes, or the like, and using coded signals thereof to spread information to the Internet world through imaging devices such as mobile phones, smartphones, and digital cameras.

CITATION LIST

Patent Literature

[PTL 1]
Japanese Unexamined Patent Application Publication No. 2007-43706
[PTL 2]
Japanese Unexamined Patent Application Publication No. 2009-212768

SUMMARY

Technical Problem

However, the display methods according to Patent Literatures 1 and 2 entail a problem that it is impossible to appropriately transmit a signal for visible light communication.

In view of this, the present disclosure provides a display method for appropriately transmitting a visible light communication signal.

Solution to Problem

The display method according to the present disclosure is a display method for displaying an image included in a video signal on a per frame basis, the display method including: a visible light communication image generating step of coding a visible light communication signal to generate an image having a striped pattern for visible light communication as a first visible light communication image; a first display step of displaying the image included in the video signal, in a predetermined frame; and a second display step of displaying a low-luminance image in the predetermined frame, and sequentially displaying the first visible light communication image, the low-luminance image being an identification image and having uniform luminance lower than average luminance of the image which is to be displayed, wherein in the second display step, after the image included in the video signal is displayed in the predetermined frame, each of the first identification image and the first visible light communication image is displayed in a same frame as the predetermined frame, for a period shorter than the predetermined frame.

Advantageous Effects

According to the present disclosure, it is possible to appropriately transmit a visible light communication signal.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENTS

Figure 1:
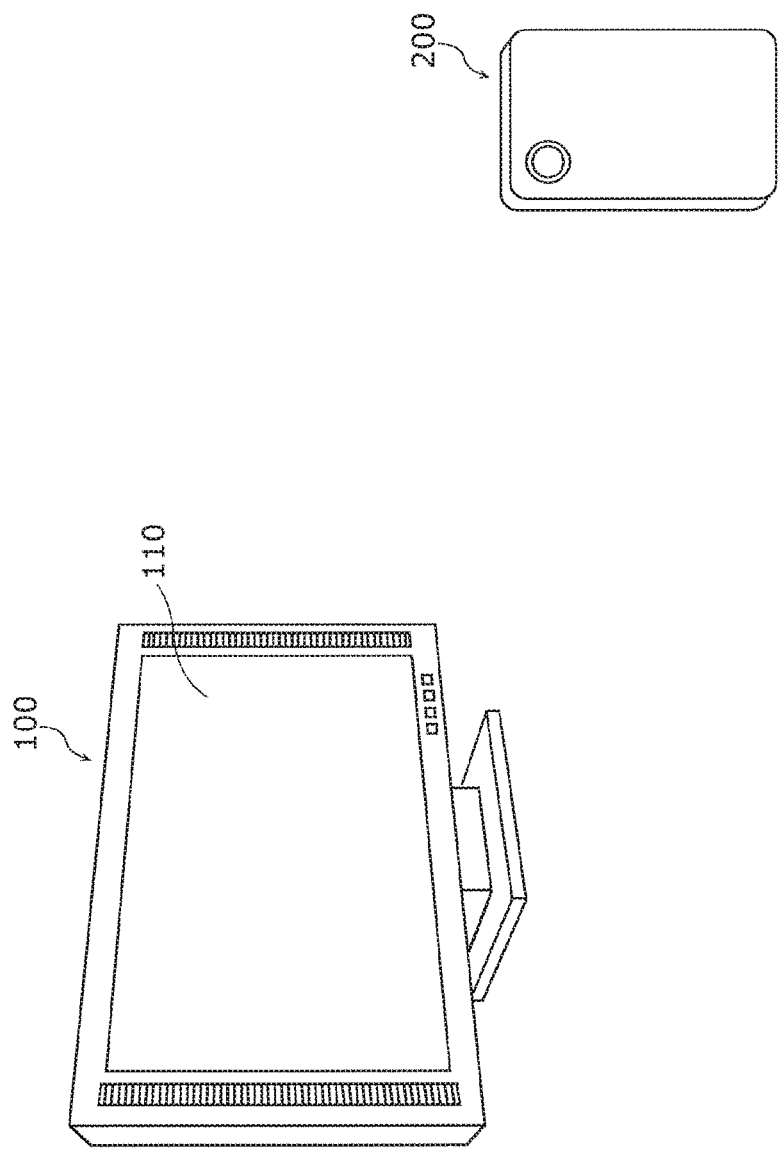
FIG. 1 is a schematic diagram illustrating an example of a visible light communication system according to an embodiment.

The following describes embodiments in detail with reference to the drawings as appropriate. Descriptions which are more detailed than necessary may, however, be omitted. For example, detailed descriptions on already well-known matters and overlapping descriptions on substantially the same configurations may be omitted. The reason for this is to avoid the following description becoming unnecessarily redundant, thereby helping those skilled in the art easily understand it.

It is to be noted that the Applicants provide the appended drawings and the following description to help those skilled in the art fully appreciate the present disclosure and do not intend to thereby restrict the subject matter recited in the Claims.

(Circumstances that Led to the Present Disclosure)

The display methods according to Patent Literatures 1 and 2 are intended to superimpose, on a video, a visible light communication signal by blinking a backlight. For this reason, it is impossible to transmit any visible light communication signal during a period of time in which the backlight is OFF. In the period in which visible light communication signal cannot be transmitted, communication needs to be performed in a state in which image quality is reduced so as not to cause a signal transmission error. It is to be noted that a field of view is a screen size in the present disclosure.

In addition, these methods have restrictions on the size of the field of view, a focus level, etc., and have a problem of taking time to recognize the image.

The present disclosure provides a display method for inserting a visible light communication signal in a video and transmitting the video while reducing the restrictions required for communication without significantly reducing the image quality.

The display method according to an aspect of the present disclosure is a display method for displaying an image included in a video signal on a per frame basis, the display method including: a visible light communication image generating step of coding a visible light communication signal to generate an image having a striped pattern for visible light communication as a first visible light communication image; a first display step of displaying the image included in the video signal, in a predetermined frame; and a second display step of displaying a low-luminance image in the predetermined frame, and sequentially displaying the first visible light communication image, the low-luminance image being an identification image and having uniform luminance lower than average luminance of the image which is to be displayed, wherein in the second display step, after the image included in the video signal is displayed in the predetermined frame, each of the first identification image and the first visible light communication image is displayed in a same frame as the predetermined frame, for a period shorter than the predetermined frame.

In this way, for example, the first visible light communication image is displayed after a full screen black image or a uniform gray image is displayed as the identification image, and thus the imaged image obtained by imaging the image to be displayed on a per frame basis using an image sensor in rolling shutter mode includes uniform black or gray lines indicating the starting position of the visible light communication signal. Accordingly, the receiving device including the image sensor is capable of easily reading the visible light communication signal from the imaged image. As a result, it is possible to appropriately transmit the visible light communication signal. In addition, since there is no need to blink the backlight for transmitting the visible light communication signal, it is possible to insert the visible light communication signal in the video and transmit the video while reducing the restrictions required for communication without significantly reducing the image quality.

In addition, the display method may further include a third display step of displaying an image having a striped pattern for visible light communication as a second visible light communication image after the first visible light communication image is displayed.

In this way, since the visible light communication images each having the striped pattern are displayed, the receiving device can reliably receive the visible light communication signals indicated by the visible light communication images.

In addition, the second visible light communication image displayed in the third display step may have a striped pattern different in direction from the striped pattern of the first visible light communication image.

In this way, since each of the visible light communication images displayed has a striped pattern different in direction from the striped pattern of the other visible light communication images, it is possible to reduce decrease in reception probability of visible light communication signals by the direction of each exposure line included in the image sensor (increase in imaging error occurrence probability).

In addition, the second visible light communication image displayed in the third display step may be a complementary image obtained by switching two luminance values or two colors which are different from each other and form the striped pattern of the first visible light communication image. Each of the striped pattern of the first visible light communication image and the striped pattern of the second visible light communication image may be formed using the two colors which have a complementary color relationship.

In this way, since the visible light communication images are displayed, for example, as complementary images such as negative images with respect to positive images, it is possible to reduce image flickering that occurs when the visible light communication images are displayed.

In addition, in the third display step, the second visible light communication image may be displayed at a display interval of 20 milliseconds or less from when the first visible light communication image is displayed.

In this way, it is possible to make the visible light communication images unnoticeable to human eyes, thereby reducing the influence of the visible light communication images onto the video signal image.

In addition, the display method may further include a first re-display step of re-displaying the identification image in a period from when the first visible light communication image is displayed to when the second visible light communication image is displayed.

In this way, since the identification image is displayed between when the first visible light communication image is displayed and when the second visible light communication image is displayed, the receiving device can receive the visible light communication signal of the first visible light communication image and the visible light communication signal of the second visible light communication image, in an appropriately separated manner.

In addition, the display method may further include a second re-display step of re-displaying the identification image after the second visible light communication image is displayed.

In this way, in the imaged image, it is possible to distinguish the end position of the visible light communication signal of the second visible light communication image, and thus appropriately transmit the visible light communication signal.

In addition, in either the first re-display step or the second re-display step, the identification image may be re-displayed in the predetermined frame, for a period shorter than the predetermined frame.

In this way, it is possible to make the identification image unnoticeable, and to reduce the influence of the identification image onto the video signal image.

Hereinafter, an embodiment is described specifically with reference to the drawings.

It is to be noted that each of the embodiments described below indicates a general or specific example of the present disclosure. The numerical values, shapes, materials, constituent elements, the arrangement and connection of the constituent elements, steps, the processing order of the steps etc., indicated in the following embodiments are mere examples and do not restrict the present disclosure. Furthermore, among the constituent elements in the following embodiments, constituent elements not recited in the independent claims each indicating the most generic concept are described as arbitrary constituent elements.

Embodiment

FIG. 1 is a schematic diagram illustrating an example of a visible light communication system according to an embodiment.

The display device 100 is, for example, a liquid crystal display device and capable of displaying a video on a display unit 110. In addition, in the video that is currently displayed on the display unit 110 includes a visible light communication signal inserted therein for indicating information related to the displayed video. A receiving device 200 receives the visible light communication signal transmitted by being displayed on the display unit 110 of the display device 100 by imaging the video displayed on the display unit 110. The receiving device 200 is implemented as, for example, a smartphone including an image sensor in rolling shutter mode. With this, a user can receive information such as the information related to the image displayed on the display unit 110.

In this embodiment, the liquid crystal display device is taken as an example of the display device 100. However, it is to be noted that the display device 100 may be an organic EL display device, a display device such as a plasma display device, a projection display device, or a projecting display device such as a projector.

In addition, the smartphone is taken as an example for the receiving device 200, the receiving device 200 may be any electronic device which mounts an image sensor capable of performing the rolling shutter mode. For example, the receiving device 200 may be a digital still camera.

Figure 2:
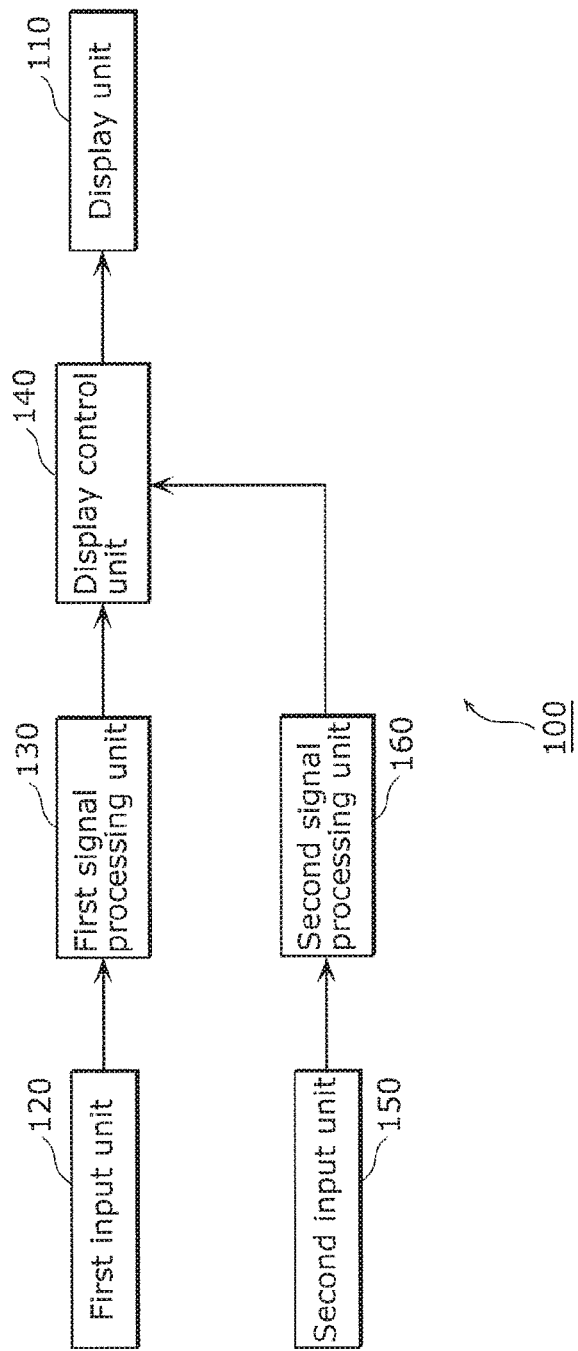
FIG. 2 is a block diagram illustrating a schematic configuration of a display device according to the embodiment.

FIG. 2 is a block diagram illustrating a schematic configuration of a display device 100 according to this embodiment. As illustrated in FIG. 2, the display device 100 includes: a display unit 110; a first input unit 120; a first signal processing unit 130; a display control unit 140; a second input unit 150; and a second signal processing unit 160.

The first input unit 120 receives a video signal related to a video to be displayed on the display unit 110 from a broadcast wave, a video recorder, a video player, a PC etc. via an antenna cable, a video signal line, for example a composite cable, an HDMI (registered trademark) cable, a PJLink cable, etc. or a LAN cable or the like, and transmits the received video signal to the first signal processing unit 130. In the video recorder or the video player, signals stored in various kinds of recording media may be used.

The first signal processing unit 130 performs general image processing such as decoding on an input video signal, and separates each of frames into a plurality of subframes. The first signal processing unit 130 transmits the subframes and information indicating the size of the video signal, a display timing, and brightness to the display control unit 140 and the second signal processing unit 160. It is to be noted that a frame corresponds to time for displaying a single picture included in a video signal, and is, for example, 1/60 second. In addition, a subframe corresponds to time obtained by diving a frame, and corresponds to time of 1/4 or the like of the frame.

The second input unit 150 receives a visible light communication signal generated using a PC or the like via an exclusive cable or the like, or a LAN cable or the like. A visible light communication signal may be received by being superimposed on part of a broadcast wave and via an antenna cable. Alternatively, a visible light communication signal recorded in a video recorder or a visible light communication signal generated separately using a PC may be superimposed on a video signal, and the video signal with the visible light communication signal may be transmitted to or received from the video recorder or the video player via a line which is part of an HDMI (registered trademark) cable, a PJLink cable, or the like. In the video recorder or the video player, signals stored in various kinds of recording media may be used. In addition to the reception from outside, there is a method for using information such as ID of the display device 100 stored in the display device, as a replacement for information that is obtained by reading information from a server via the Internet. The second input unit 150 transmits the received signal to the second signal processing unit 160. Hereinafter, a group of sequential data of a visible light communication signal is described as a block.

The second signal processing unit 160 generates a modulation signal of a visible light communication signal received by the second input unit 150, and generates a visible light communication image based on the modulation signal. The visible light communication signal may be coded conforming to JEITA-CP 1222 or 1223, or a standard such as the IEEE-P802.15.7. In addition, the coding may correspond to decoding in a receiving device. Any other coding method such as Manchester coding or the like may be used for modulation. Here, two-value coding is performed. However, in view of the fact that a display gray level can be directly used, it is also possible to perform three-or-more-value coding. Stated differently, it is possible to transmit information whose amount is at least twice the conventional one.

The second signal processing unit 160 determines to which one of the subframes of a frame a visible light communication image is inserted, based on the information related to the brightness etc. of the video included in the video signal received from the first signal processing unit 130. For example, a subframe of a frame that is displayed comparatively brightly is selected, and a visible light communication image is inserted in the subframe. The second signal processing unit 160 may select a subframe that is displayed comparatively brightly, and insert a visible light communication image in the subframe.

When the display gray level is presented using subframes with weights, the width of the display gray level may be increased due to error dispersion. In this case, when using a subframe having a small weight, it is possible to select a period in which luminance is constant even if an error is dispersed and a blinking state is continued, and display a visible light communication image in the period.

Furthermore, as for normal display of a video, it is also possible to provide a display method for correcting, using another subfield, increase and decrease of luminance due to display of a visible light communication image, allowing a user to view naturally the video as a sequential video.

It is also possible to set or generate a temporal area in which a normal video is displayed and a temporal area in which a visible light communication image is displayed. At this time, the second signal processing unit 160 may select a comparatively bright frame as a frame in which a visible light communication image is inserted or displayed.

In addition, when a position or a temporal area at and in which a visible light communication image is inserted is determined in advance, the second signal processing unit 160 does not need to perform a process of determining a subframe or the temporal area in which the visible light communication image is inserted. In this case, it is only necessary to insert the visible light communication image in the predetermined subframe or temporal area, and display or output the video with the visible light communication image.

In addition, although it is desirable that time for displaying a visible light communication image be short as much as possible, time depends on performances of a receiving device side, and this matter will be described in detail later.

The second signal processing unit 160 transmits, to the display control unit 140, the generated visible light communication image and display timing information indicating the subframe or the temporal area in which the visible light communication image is inserted.

The display control unit 140 inserts the visible light communication image which is input by the second signal processing unit 160 into a video signal which is input by the first signal processing unit 130, according to the display timing information which is input by each of the first signal processing unit 130 and the second signal processing unit 160. As described later, with consideration of a video response speed etc., it is desirable that the display control unit 140 display images by using a switching element which is a solid-state imaging element. The display unit 110 displays a video signal which is input by the display control unit 140.

Figure 3:
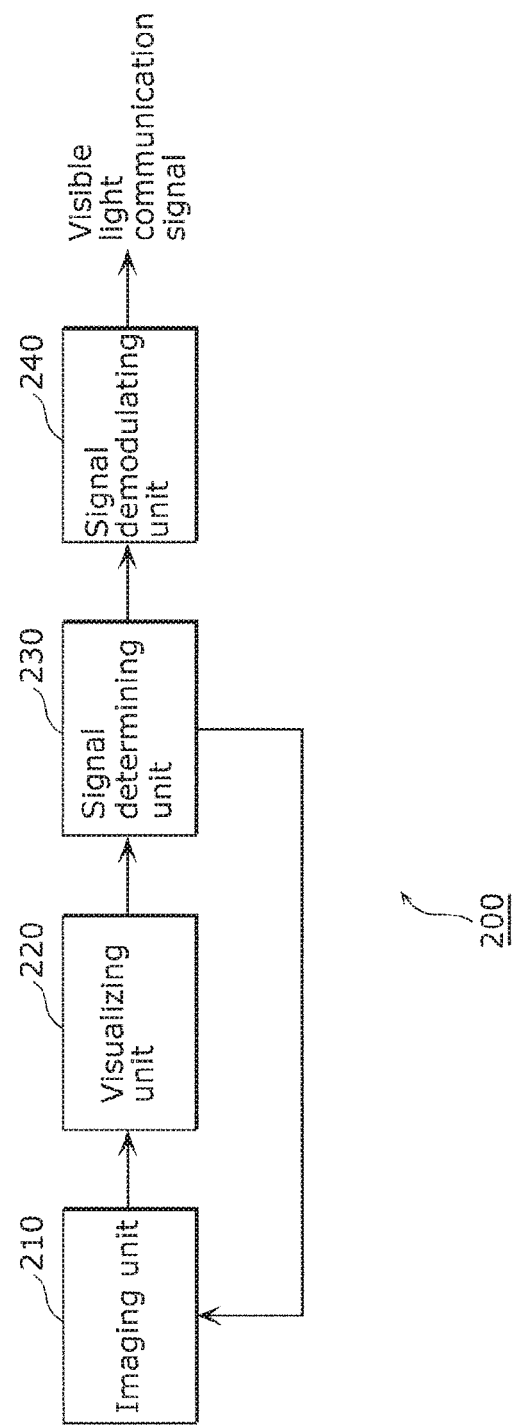
FIG. 3 is a block diagram illustrating a schematic configuration of a receiving device according to the embodiment.

FIG. 3 is a block diagram illustrating a configuration example of a receiving device 200 according to this embodiment.

As illustrated in FIG. 3, the receiving device 200 includes: an imaging unit 210; a visualizing unit 220; a signal determining unit 230; and a signal demodulating unit 240.

The imaging unit 210 images an image which is displayed on the display unit 110. The imaging unit 210 is, for example, formed with an image sensor in rolling shutter mode. When imaging is started, the image sensor performs the rolling shutter mode on a row basis, and stores imaged data in a buffer (not illustrated in the drawings). Some image sensors perform sequential imaging on a line (exposure line) basis, on an exposure element basis, on a certain element group basis, or the like. Such image sensors are handled in the same manner, only for the purpose of obtaining data arranged in the horizontal direction of an image.

The visualizing unit 220 presents the luminance values of the respective pixels as a bit map displayed two dimensionally with respect to the data imaged by the imaging unit 210 and stored in the buffer, and outputs the bit map as a video to the signal determining unit 230.

The signal determining unit 230 determines whether or not a visible light communication image is included in the video input by the visualizing unit 220. First, the signal determining unit 230 searches for the header part of each data having a one block size, and determines whether or not data is included. When determining that the visible light communication image is inserted in the input video, the signal determining unit 230 outputs the input video to the signal demodulating unit 240 and gives the imaging unit 210 an instruction to stop an imaging operation. In addition, when the signal determining unit 230 determines that the visible light communication image is not inserted in the input signal, the imaging unit 210 further repeats the rolling shutter mode while overwriting data stored in the buffer onto image data obtained through imaging. Here, when the signal determining unit 230 cannot determine a video in which the visible light communication image is inserted even through imaging in a certain period, the signal determining unit 230 causes the imaging unit 210 to stop the imaging operation.

The signal demodulating unit 240 extracts the visible light communication image from the video output by the signal determining unit 230, and demodulates it to the original visible light communication signal.

Next, visible light communication images obtained by visualizing visible light communication signals are described.

Figure 4:
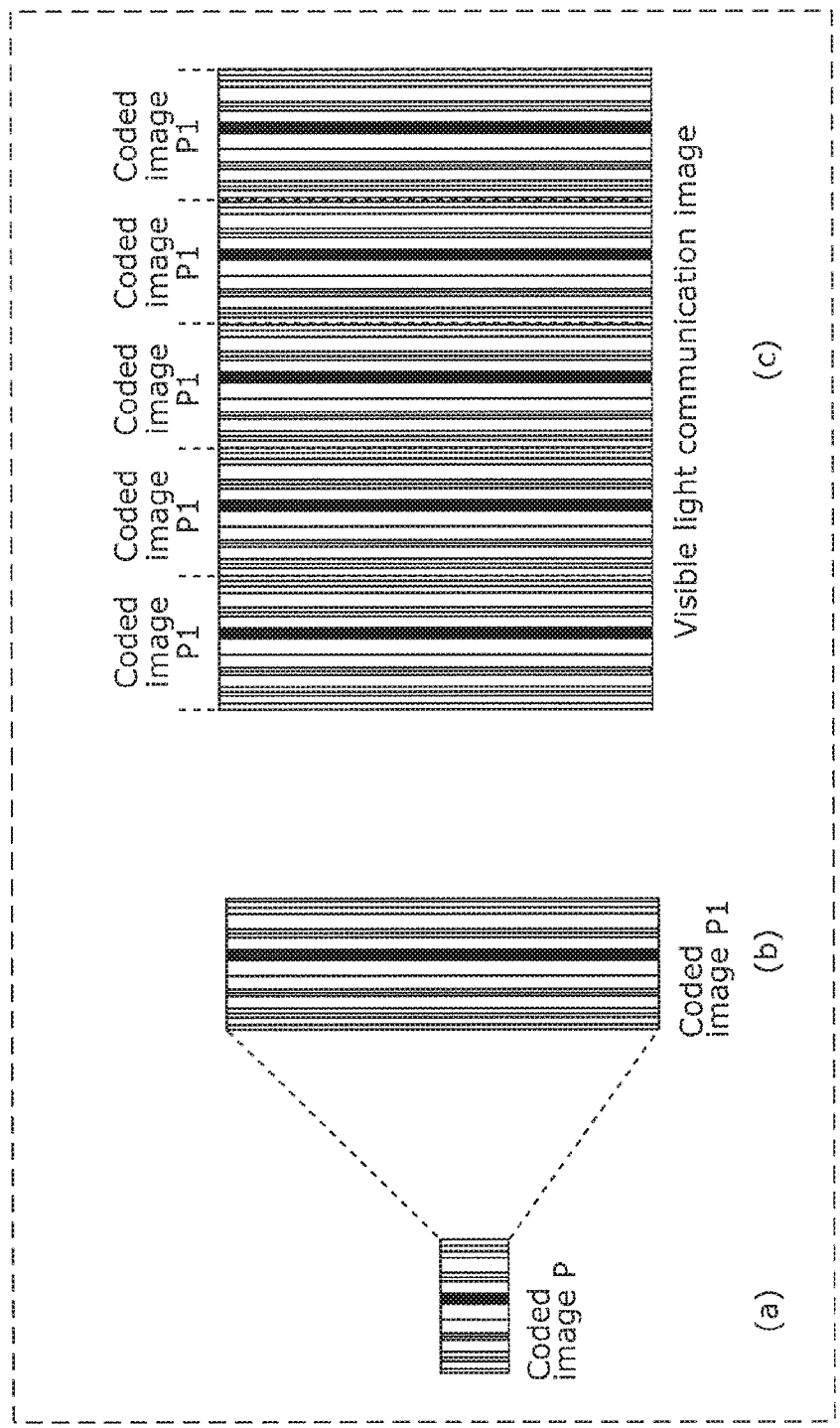
FIG. 4 is a diagram illustrating examples of a visible light communication image and coded images according to the embodiment.

FIG. 4 is a diagram illustrating an example of a visible light communication image. In FIG. 4, (a) illustrates a coded image P obtained by coding an one-block visible light communication image, and presented as light and dark contrast patterns in the horizontal direction. As illustrated in (b) of FIG. 4, the raw coded image P in (a) of FIG. 4 is expanded toward both ends of the display unit 110 in the perpendicular direction, that is, toward both ends of the display screen, to generate a coded image P1. Subsequently, as illustrated in (c) of FIG. 4, the coded image P1 in (b) of FIG. 4 is displayed repeatedly five times in the horizontal direction, to generate a final visible light communication image. Here, the number of times of repetition in the horizontal direction is determined according to the size of the coded image corresponding to one block and the size of the video (display screen).

Since the one-block coded image is expanded, light can be caught with many exposure lines, and thus an increase in a receiving probability can be expected. In addition, the reason why the one-block coded image is repeatedly displayed is to address differences made in the field of view due to the distance between the display device 100 and the receiving device 200 and performances of the imaging unit 210 of the receiving device 200. This means that, even if the receiving device 200 does not have a function of imaging the display unit 110 entirely, it is possible to obtain the coded image P1 illustrated in (a) of FIG. 4 by imaging any part of the visible light communication image which is displayed on the display unit 110. By generating the visible light communication image in this way, it is possible to reduce restrictions on imaging circumstances for the receiving device 200. Close-up photography is more effective as the number of times of repetition of the coded image is increased. In addition, on the precondition that the receiving device 200 is capable of imaging the display screen entirely, the coded image does not always have to be repeated.

Hereinafter, operations performed by a visible light communication system according to this embodiment are described in detail. First, operations performed by the display device 100 are described.

Figure 5:
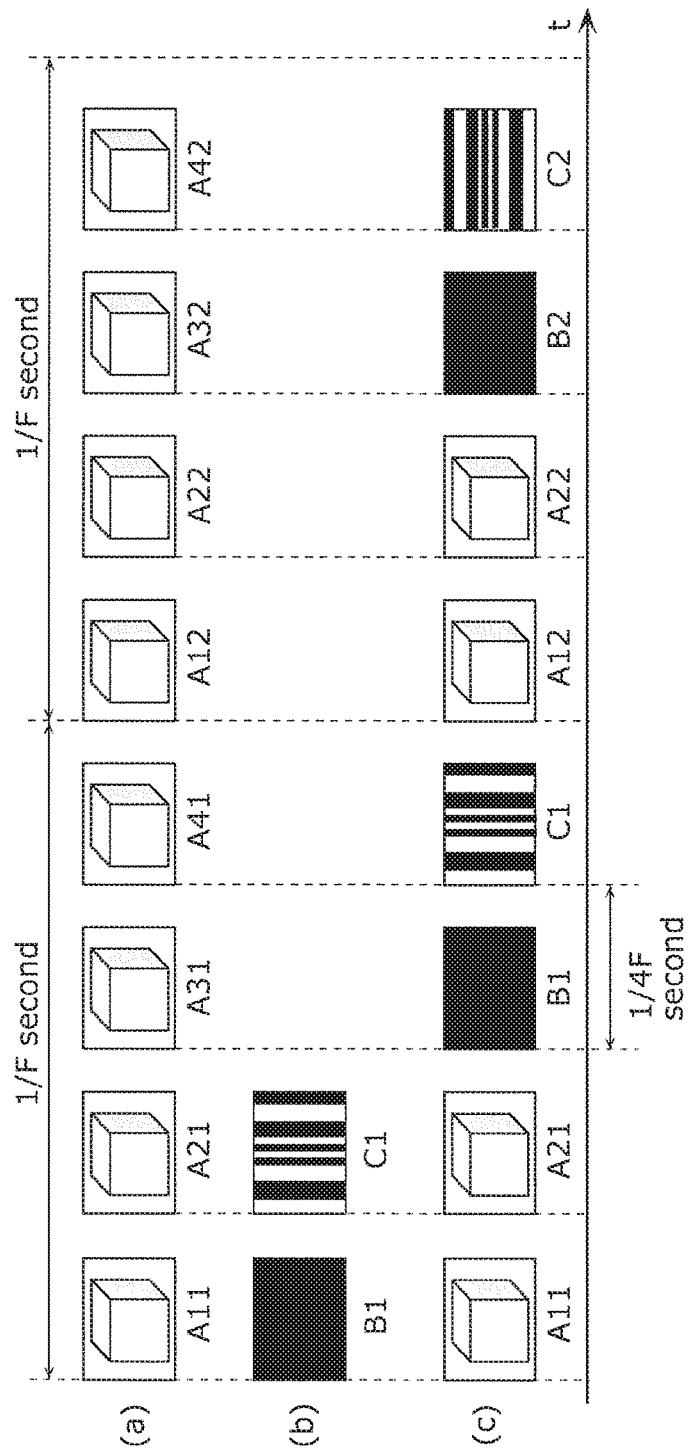
FIG. 5 is a diagram for illustrating operations performed by the display device according to the embodiment.

FIG. 5 is a diagram for illustrating the operations performed by the display device 100 according to this embodiment. In FIG. 5, the horizontal direction is the time axis.

In FIG. 5, (a) illustrates images which are output from the first signal processing unit 130; (b) illustrates images which are output from the second signal processing unit; and (c) illustrates images which are output from the display control unit 140.

First, as illustrated in (a) of FIG. 5, four images are output sequentially for 1/F second from the first signal processing unit 130. This means that a video received by the first input unit 120 displays the four images sequentially for 1/F second. The first signal processing unit 130 transmits, to the display control unit 140, display timing information for displaying the four images sequentially for 1/F second. In addition, the first signal processing unit 130 outputs images A11, A21, A31, A41, . . . per 1/F second to the display control unit 140. Furthermore, the first signal processing unit 130 transmits, to the second signal processing unit 160, display timing information that is the same as display timing information transmitted to the display control unit 140.

Next, as illustrated in (b) of FIG. 5, the second signal processing unit 160 outputs, to the display control unit 140, a full screen black image B1 which is stored in advance, and a visible light communication image C1 generated from a visible light communication signal input from the second input unit 150. In this case, the second signal processing unit 160 determines images A1x, A2x, A3x, and A4x to be images to which a visible light communication image is mixed, based on brightness of the images (x denotes that the image is an x-th frame). In addition, the second signal processing unit 160 displays the four images sequentially for 1/F second, and determines that a full screen black image Bx and a visible light communication image Cx are mixed in the third frame and the fourth frame, respectively. The second signal processing unit 160 outputs the information related to the determined display to the display control unit 140 as display timing information. For example, x denotes 1.

Next, as illustrated in FIG. 5, the display control unit 140 determines, according to the input display timing information, display timings of the image A input from the first signal processing unit 130 and the full screen black image Bx and the visible light communication image Cx input from the second signal processing unit 160. In this case, the display control unit 140 causes the display unit 110 to display the four images sequentially for 1/F second. The display control unit 140 causes the display unit 110 to display: images A11 and A21 transmitted from the first signal processing unit 130 as the first and second images; a full screen black image B1 transmitted from the second signal processing unit 160 as the third image; and a visible light communication image C1 transmitted from the second signal processing unit 160 as the fourth image.

Furthermore, the display control unit 140 causes the display unit 110 to display the four images sequentially for next 1/F second. In this case, the display control unit 140 causes the display unit 110 to display, in the four images: images A1 (x+1) and A2 (x+1) as the first and second images; a full screen black image B (x+1) as the third image; and a visible light communication image C (x+1) as the fourth image. In the example of FIG. 5, the fourth-frame visible light communication image C1 is turned by 90 degrees, and a visible light communication image C2 formed to have the same size as the visible light communication image C1 is mixed. Stated differently, when mixing a visible light communication image plural times, the same visible light communication image may be mixed plural times, the original visible light communication image may be complementary, or turned and mixed. This is effective to adjust to an imaging direction or angle of the receiving device 200. The full screen black images B1 and B2 may be the same, or the visible light communication images C1 and C2 may be the same or may be different as described earlier.

In addition, each of images A1x, A2x, A3x, A4x, a full screen black image Bx, and a visible light communication image Cx is displayed at a 1/F interval.

It is to be noted that, depending on videos, visible light communication images may be displayed on per several frames basis instead of being displayed in consecutive frames, or may be displayed at random.

It is to be noted that subframes in this embodiment may not be subframes generated at a display gray level, but subframes generated for increase in image quality, that is, for what is called quadruple driving or the like performed by a liquid crystal display device or the like.

Next, operations performed by the receiving device 200 are described.

Figure 6A:
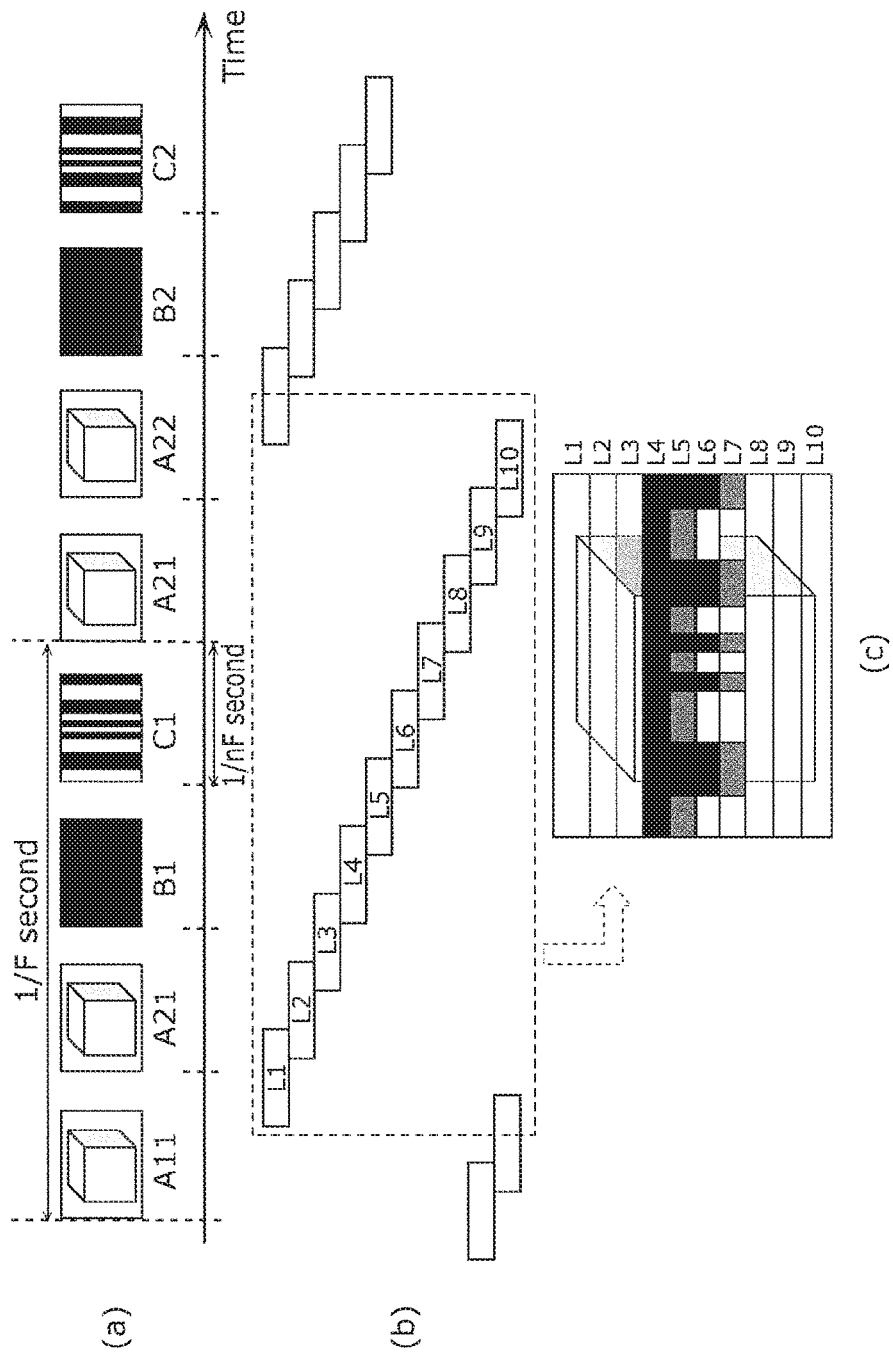
FIG. 6A is a diagram for illustrating operations performed by the display device and the receiving device according to the embodiment.
Figure 6B:
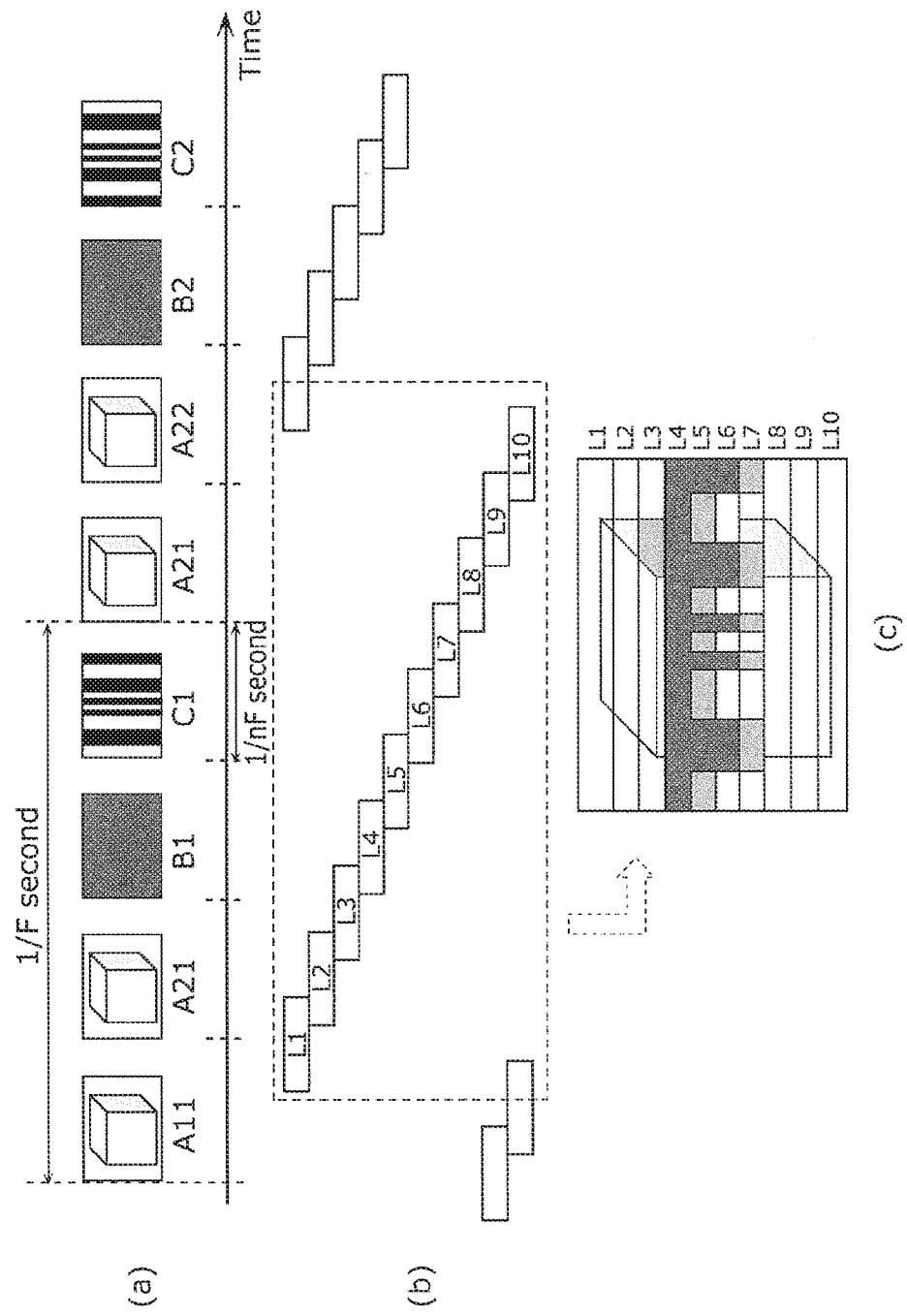
FIG. 6B is a diagram for illustrating operations performed by the display device and the receiving device according to the embodiment.

Each of FIGS. 6A and 6B is a diagram for illustrating operations performed by the display device according to this embodiment. In each of FIGS. 6A and 6B, the horizontal direction is the time axis.

In FIG. 6A, (a) illustrates images displayed on the display unit 110 of the display device 100; (b) illustrates exposure time of each exposure line in the imaging unit 210; and (c) illustrates an image imaged by the receiving device.

As illustrated in (a) of FIG. 6A, four images are displayed sequentially for 1/F second on the display unit 110. In the example of (a) in FIG. 6A, a full screen black image B1 and a visible light communication image C1 are displayed as the third frame and the fourth frame, respectively, among the four images.

The imaging unit 210 images a video which is displayed on the display unit 110. In the case where the imaging unit 210 is formed with an image sensor in rolling shutter mode, when imaging is started, the image sensor performs the rolling shutter mode on a line basis, and stores imaged data in a buffer (not illustrated in the drawings). The unit in which each of the parts of the rolling shutter mode is referred to as an exposure line since the rolling shutter mode is particularly assumed to be performed on a per line basis here. In the case of (b) in FIG. 6A, exposure is performed in the order of exposure lines L1, L2, L3, . . . .

Although the image sensor is divided into ten exposure lines as an example in (b) of FIG. 6A, it is to be noted that the image sensor may be divided into any other segments or may not be in a line shape. The rolling shutter mode is performed on the respective exposure lines so that the exposure time for each of the exposure lines overlaps for an extremely short time with the exposure time of a next one of the other exposure lines.

In FIG. 6A, (c) illustrates an image stored in a buffer at the time when imaging of all of the exposure lines are finished. In this case, although the beginning of the image in the frame and the beginning of an imaging unit match with each other unexpectedly, the beginning of the imaging unit may be started with a shift. In this case, in an image imaged by the receiving device 200 side, a signal is imaged as a short horizontal stripe in the horizontal direction of the third frame from the top, as illustrated in (c) of FIG. 6A. In this case, the horizontal stripe changes only upward or downward in the image and is always observed. Thus, there is no need to control timing and to obtain a trigger signal from anywhere. In the case of (c) in FIG. 6A, a visible light communication image is imaged in exposure line L6.

The visualizing unit 220 presents the luminance values of the respective pixels as a bit map displayed two dimensionally with respect to the data imaged by the imaging unit 210 and stored in the buffer, and outputs the bit map as a video to the signal determining unit 230.

The signal determining unit 230 determines whether or not a visible light communication image is included in the video input by the visualizing unit 220. In the case of FIG. 6A, when a video in (c) of FIG. 6A is input, the signal determining unit 230 determines that the visible light communication image is inserted in the exposure line L6 among exposure lines L1 to L10, outputs the input video to the signal demodulating unit 240, and instructs the imaging unit 210 to stop an imaging operation.

The signal demodulating unit 240 extracts the image of exposure line L6 indicating the visible light communication image from the video output by the signal determining unit 230, and demodulates it to the original visible light communication signal.

The determination by the signal determining unit 230 is made on a per input video basis, but may be made on a per exposure line basis. In this case, at the time when it is determined that the visible light communication image is included in the exposure line L6, it is possible to skip making determinations for the exposure line L7 and the following exposure lines and stop the operation by the imaging unit 210.

The case described above is a case in which the video is formed in F frames per one second as illustrated in FIG. 6A, time for displaying the visible light communication image is part of time in a frame, that is, ¼ of the frame in this embodiment. The period in which the visible light communication image is displayed may be other than ¼ of the frame, but should desirably be at most ¼ or less of the frame with consideration of making the signal unnoticeable as much as possible. Furthermore, it is desirable that the value is small as much as possible within a range which can be supported by the receiving device 200 side.

With this configuration, on condition that a visible light communication image is inserted in a short period and an exposure time is sufficiently short, in other words, the exposure time (shutter speed) is sufficiently shorter than 1/nF second (n=4 in the case of FIG. 6A), based on FIG. 6A, any one of the exposure lines corresponds to the time for displaying the visible light communication image. It is desirable that no other image is inserted in the exposure time of each exposure line. Thus, in the example of FIG. 6A, it is possible to reliably image an image in which no other image is inserted by further reducing the exposure time to be smaller than a half of ¼F second. As illustrated in FIG. 6B, a full screen gray image Bx having a luminance value that is uniformly brighter than that of a full screen black image may be inserted instead of a full screen black image Bx.

In this way, with a combination of the receiving device 200 which causes the imaging unit 210 to perform the rolling shutter mode and the display device 100, it is possible to easily transmit and receive the visible light communication signal in the simple configuration because there is no restrictions in timing.

Stated differently, the display method according to this embodiment is a display method for displaying an image included in a video signal on a per frame (for example, 1/F second) basis as illustrated in FIGS. 5, 6A, and 6B. The display method includes: a visible light communication image generating step of coding a visible light communication signal to generate an image having a striped pattern for visible light communication as a first visible light communication image (C1); a first display step of displaying the image (A11, A21) included in the video signal, in a predetermined frame; and a second display step of displaying a low-luminance image in the predetermined frame, and sequentially displaying the first visible light communication image (C1), the low-luminance image being an identification image (B1) and having uniform luminance lower than average luminance of the image (A11, A21) which is to be displayed, wherein in the second display step, after the image (A11, A21) included in the video signal is displayed in the predetermined frame, each of the first identification image (B1) and the first visible light communication image (C1) is displayed in the same frame as the predetermined frame, for a period shorter than the predetermined frame.

In this way, for example, the first visible light communication image (C1) is displayed after a full screen black image or a uniform gray image is displayed as an identification image (B1), and thus the imaged image obtained by imaging the image to be displayed on a per frame basis using an image sensor in rolling shutter mode includes uniform black or gray lines (L4) indicating the starting position of the visible light communication signal. Accordingly, the receiving device 200 including the image sensor is capable of easily reading the visible light communication signal from the imaged image. As a result, it is possible to appropriately transmit the visible light communication signal. In addition, since there is no need to blink the backlight for transmitting the visible light communication signal, it is possible to insert the visible light communication signal in the video and transmit the video without significantly reducing the image quality.

In addition, the display method according to this embodiment further includes: a third display step of displaying the image having the striped pattern for visible light communication as a second visible light communication image (C2) after the first visible light communication image (C1) is displayed. In this way, since the visible light communication images (C1 and C2) having the striped patterns are repeatedly displayed, the receiving device 200 can reliably receive the visible light communication signals indicated by the visible light communication images (C1 and C2).

It is desirable that the time in which each visible light communication image is inserted and the scanning speed and the exposure time of the imaging unit 210 in rolling shutter mode satisfy the relationship expressed by Expression 1. This is because some exposure lines are each exposed correspondingly to a boundary between a video signal and a visible light communication signal, which results in extreme decrease in S/N ratio.

Exposure time of one exposure line<$1/(2\times nF)$     [Expression 1]

In Expression 1, n denotes the number of subframes obtained by uniformly dividing a frame for which a video is displayed, and F denotes the number of frames which are displayed in one second. Here, n denotes an integer number, and F denotes a positive number.

It is desirable that the time for displaying the visible light communication image or the coded image (the exposure time of one exposure line) be within 1 millisecond, or be further limited to 0.2 millisecond, with consideration of a time width in which the visible light communication image or the coded image is difficult to be recognized as an afterimage to human eyes. Considering that the general number of frames of a current video signal is expressed by F=60, it is desirable that n>8 be satisfied or more desirably n>40 be satisfied in order to satisfy Expression 1.

The reason why the range desirable as time for displaying the visible light communication image or the coded image is set is described hereinafter. It is said that time resolutions of human eyes are generally approximately 50 milliseconds, and thus, in the case of the time resolutions less than approximately 50 milliseconds, an image is recognized as an after image in which adjacent images are mixed. On the other hand, as for the upper limit of luminance differences recognizable by human eyes, it is said that most people can recognize a luminance difference of approximately 2% or more between adjacent areas although there are individual differences. Accordingly, in order to prevent the inserted visible light communication image or the coded image from being recognized as an image in which adjacent images are mixed and having a luminance difference, it is desirable that the time be 2% of 50 milliseconds, that is, 1 millisecond or less.

In the case of a general image sensor in rolling shutter mode, in view of general-purpose use, one frame needs to be divided into at least two segments in order not to generate an afterimage in an image. If a raw frame is used directly, there is a concern about an adverse effect such as a subliminal effect. Thus, the number of frame segments which are required at minimum is expressed by n=2. In view of this, it is desirable to select exposure time shorter than 1/480.

Specific means for outputting a visible light communication image or a coded image from a video device in an extremely short period include a plasma display panel (PDP) and an electro-luminescence (EL) display panel which achieve high operation speeds. In other words, the PDP or EL display panel is applicable to this embodiment under control by driving signals. However, a liquid crystal display (LCD) or the like whose liquid crystals provide a low response speed is not applicable to this embodiment even when only driving thereof is accelerated. In such a case, if particularly a backlight is a light emitting diode (LED) or the like which can blink at high speed, it is possible to turn off the LED and displays a visible light communication image or a coded image for short time. As for a projector, a projector having a liquid crystal such as a liquid crystal on silicon (LCOS) can also perform short-time display in addition to control at a light source side. Furthermore, in the case of a projector, such as a digital mirror device (DMD), which performs a method for injecting light toward a projecting side at a mirror device capable of high-speed driving, it is possible to perform short-time display under control of the DMD, and cut time under control by the light source side, and it is further reduce time with a combination of these.

Although a case in which a visible light communication signal is arranged in the horizontal direction has been described in the above embodiment, this is a non-limiting example. When arranging the visible light communication signal in the horizontal direction in a coded image, the coded image has a striped pattern. For this reason, it is impossible to obtain a coded image of a visible light communication signal in the case where the imaging unit 210 of the receiving device 200 does not image an image in the perpendicular direction in which the rolling shutter mode is performed on a line basis.

In addition, when performing imaging while tilting the receiving device 200 at a certain angle or more, a problem of failing to obtain data occurs because one-block data is not entirely included in an imaging range or the stripes in the striped pattern and the exposure lines of the receiving device 200 are parallel to each other.

Figure 7:
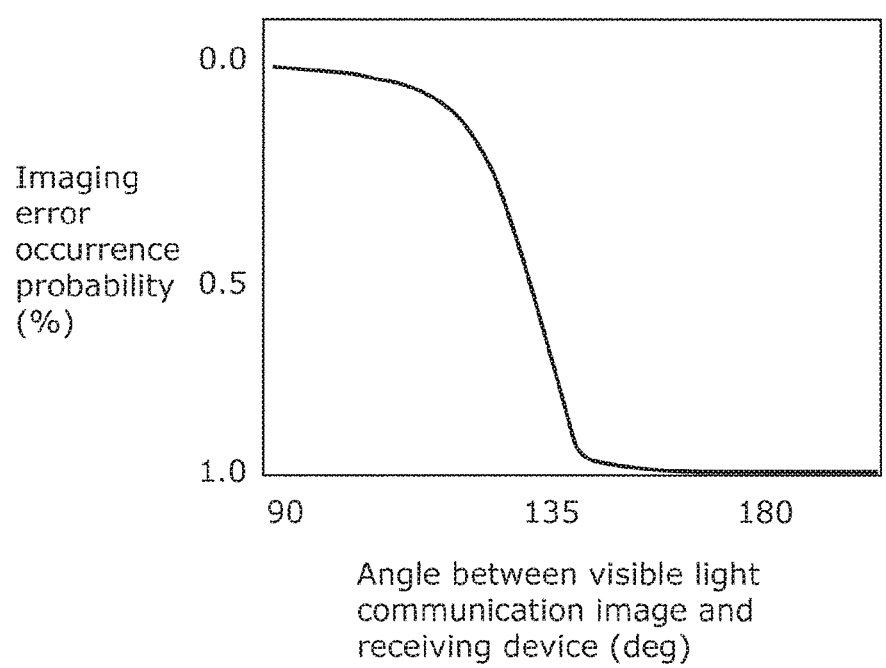
FIG. 7 is a diagram illustrating the relationship of the angles between visible light communication images and the receiving device according to the embodiment and imaging error occurrence probabilities.

FIG. 7 is a diagram illustrating an example of relationships between the visible light communication images and the receiving device 200 and imaging error occurrence probabilities.

As illustrated in FIG. 7, the relationships between (i) the angles of the stripes in the striped pattern of a visible light communication image and the receiving device 200 and (ii) the imaging error occurrence probabilities are indicated in the graph approximately showing a shape according to a cosine rule. As for the field of view obtainable by one exposure line in the receiving device 200, when an angle changes, the range of data which can be imaged according to the cosine rule is reduced, and when the data which can be imaged by a single exposure line is reduced to an area which is approximately equivalent to a block, the recognition probability increases dramatically. The relationships indicated in FIG. 7 are results obtained when the receiving device 200 images a visible light communication image or a coded image whose data corresponding to four blocks are stored on the entire display screen, from a position at which approximately the entire display screen can be imaged. Based on the relationships, it is known that the data can be obtained without any problem as long as the angle is up to approximately 135 degrees (when performing imaging with a tilt of 45 degrees). The angle at which the recognition probability changes dramatically is different depending on how many blocks of data are stored in the entire display screen, or at what distance or from which position the coded image is imaged and in what size the coded image appears on the entire screen. Furthermore, when the angle is perpendicular, it is impossible to obtain data theoretically. Thus, it is conceivable that a case in which no visible light communication signal can be received occurs, depending on which orientation (transversely or longitudinally) the viewer disposes the receiving device. In order to solve these problems, the visible light communication images may be arranged in the perpendicular direction or diagonally, or arranged in a pattern in which a perpendicular part and a horizontal part are complementary.

Figure 8:
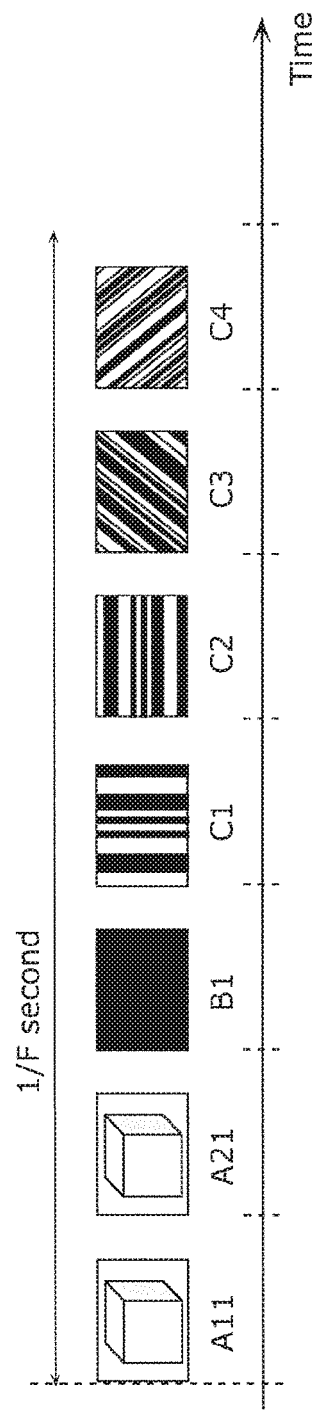
FIG. 8 is a diagram for illustrating operations performed by the display device according to the embodiment.

FIG. 8 is a diagram for illustrating how the display device 100 according to this embodiment performs an operation of displaying plural visible light communication images each having a pattern of stripes forming a different angle.

For example, as illustrated in FIG. 8, it is possible to display a visible light communication image C1 having a pattern of vertical stripes, a visible light communication image C2 having a pattern of horizontal stripes, a visible light communication image C3 having a pattern of diagonal stripes, a visible light communication image C4 having a pattern of diagonal stripes opposite in direction to the diagonal stripes in the pattern of the visible light communication image C3.

Stated differently, in the above-described third display step in this embodiment, as illustrated in FIG. 8, the second visible light communication images (C2, C3, and C4) each having the pattern of stripes different in direction from the stripes in the striped pattern of the first visible light communication image (C1) are displayed. In this way, since each of the visible light communication images (C1, C2, C3, and C4) displayed has the striped pattern different in direction from the striped pattern of the other visible light communication images, it is possible to reduce decrease in reception probability of visible light communication signals by the direction of each exposure line included in the image sensor (increase in imaging error occurrence probability).

This embodiment has described an example in which the coded image is expanded in the perpendicular direction, and then the expanded coded image is arranged repeatedly several times in the horizontal direction as an arrangement example of coded images in visible light communication images. However, the arrangement example is a non-limiting example.

Figure 9:
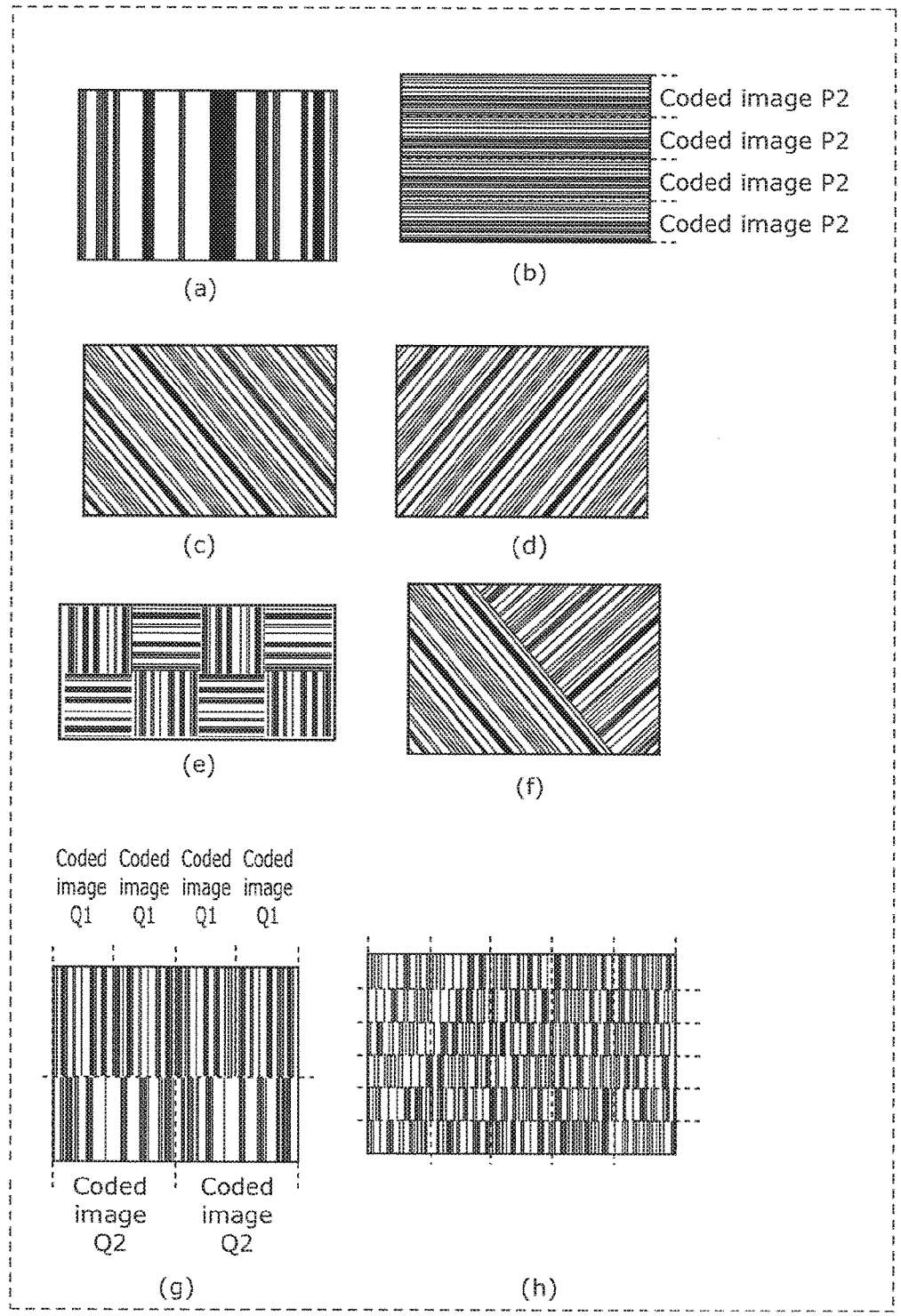
FIG. 9 is a diagram illustrating other examples of visible light communication images according to the embodiment.

FIG. 9 is a diagram illustrating an example of a visible light communication image.

The visible light communication image illustrated in (a) of FIG. 9 is an image generated by expanding a single coded image P in FIG. 4 to generate an expanded image having a full display screen size and arranging the expanded image. With this arrangement, restrictions on the pixel size of the imaged visible light communication image are reduced, which makes it possible to receive a signal from a place distant from the display unit 110.

The visible light communication image illustrated in (b) of FIG. 9 is an image obtained by turning the coded image P in FIG. 4 by 90 degrees, and arranging a coded image P2 generated by expanding the coded image P in the horizontal direction repeatedly four times in the perpendicular direction. In this case, it is possible to receive a signal in the direction in which rolling shutter mode lines of the receiving device 200 are almost directed in the perpendicular direction.

The visible light communication image illustrated in (c) of FIG. 9 is an image obtained by turning the coded image P in FIG. 4 leftward by approximately 45 degrees, expanding it to generate an expanded image having a full display screen size, and arranging the expanded image. The visible light communication image illustrated in (d) of FIG. 9 is an image obtained by turning the coded image P rightward by approximately 45 degrees, in contrast to the exemplary case of the visible light communication image in (c) of FIG. 9, expanding it to generate an expanded image having a full display screen size, and arranging the expanded image.

Assuming that the arrangements of (a) to (d) in FIG. 9 are basic arrangements, it is possible to make various arrangements by combining these arrangements. For example, the visible light communication image illustrated in (e) of FIG. 9 is an image generated by dividing the display screen into eight, and arranging coded images therein in the perpendicular direction and the horizontal direction such that coded images having a pattern of vertical stripes and coded images having a pattern of horizontal stripes form a checkerboard pattern. In the visible light communication image like this, the receiving device 200 is capable of performing imaging (receiving a visible light communication signal) by performing imaging using the field of view corresponding to at least one coded image in the display screen, irrespective of the direction and angle of the imaging unit 210 in the receiving device 200. The visible light communication image illustrated in (f) of FIG. 9 is an image generated by diagonally dividing the display screen, and arranging, in combination, the coded images of (c) of FIG. 9 and the coded images of (d) of FIG. 9.

The visible light communication image illustrated in (g) of FIG. 9 is an image generated by: arranging a coded image Q1, which is generated by expanding the original coded image, four times repeatedly in the horizontal direction of the entire display screen in the upper side of the display screen; and arranging a coded image Q2, which is generated by expanding the original coded image, twice repeatedly in the horizontal direction of the entire display screen in the lower side of the display screen. With the arrangement, the image to be imaged by the receiving device 200 side is large and the resolution is high when the distance between the place to be imaged in the receiving device 200 side and the display unit 110 is short, and the resolution is low when the distance is long. In other words, it is preferable that the number of coded images to be displayed repeatedly be large in the case where imaging is performed at a place close to the display unit 110, and that the number of coded images to be displayed repeatedly be small in the case where imaging is performed at a place close to the display unit 110. Accordingly, the visible light communication image in (g) of FIG. 9, is available in both the cases. As illustrated in (g) of FIG. 9, the visible light communication image is generated by combining two repetitive arrangements and four repetitive arrangements. However, a combination of any other repetitive arrangement may be made.

The visible light communication image illustrated in (h) of FIG. 9 is an image obtained by dividing the display screen in the perpendicular direction into five, and arranging coded images each having a different stripe phase in corresponding ones of the areas generated through the division. With this, it is possible to prevent light and dark contrast localization depending on places, thereby expecting an effect of preventing flickering caused with visual line movements. Here, the striped pattern is a pattern of vertical stripes, the number of times of division in the perpendicular direction is five, and the phases are sequentially changed so that the uppermost phase and the lowermost phase match. However, the number of times of divisions and phase changes are not limited thereto, and may be at random.

In addition, each of the images illustrated in FIG. 4 and FIG. 9 has an advantage and a disadvantage. Thus, an image generated by arbitrarily combining these images according to use application may be used as a visible light communication image. In addition, at that time, the image may be turned by an arbitrary angle and used.

Furthermore, when the visible light communication image is displayed temporally repeatedly, display order or image display may be changed at random on a per frame basis according to use applications.

It is to be noted that in a display device which produces a period in which the entire display screen is not displayed at the same time, such as a liquid crystal display device which performs sequential scanning and backlight scanning, it is possible to expect increase in communication probability by using a pattern of vertical stripes with respect to the scanning direction. Since scanning is performed in the perpendicular direction in a general liquid crystal display device, it is desirable to apply an image obtained by replacing the perpendicular stripes in the coded image in (b) of FIG. 4 with horizontal stripes. In Embodiment 1, four images are displayed sequentially for 1/F second, and an image obtained by coding a visible light communication signal is displayed as the fourth image, but this is a non-limiting example. For example, it is also good to display a visible light communication image only in a given period, and display an image of a normal video signal in the other period. At this time, the video signal inevitably changes due to the insertion of the visible light communication image. It is also good to address this by correcting a signal of the other part of the video signal in a frame.

In addition, it is also good to directly transmit a signal processed by a normal video processing unit as it is to the display control unit. Furthermore, it is also good to take a method for ignoring each of all video signals other than the visible light communication image of the frame, performing display in black or gray color having a constant gray level in conjunction with the video before and after the video signal, and enhancing only the video signal for the receiving side.

In addition, a full screen black image is placed before the visible light communication image in this embodiment in order to prevent a signal from being received in a mixed manner with a video signal image. However, a full screen black image is not always required. However, since restrictions on performances at the receiving device 200 side are reduced by inserting such a signal, it is also good to insert a full screen black signal (full screen black image) for a certain period.

In addition, the full screen black image is inserted only at the front side of the visible light communication image in this embodiment, but may be inserted at the rear side thereof. Furthermore, full screen black images may be inserted at both the front and rear sides of the visible light communication image. At this time, it is good to consider time required for the visible light communication image and the full screen black image parts at both of the front and rear sides thereof in replacement for time in which the visible light communication image is inserted.

In addition, full screen black images are not limited to images having a luminance level of 0% on the entire surface thereof. Full screen black images do not have to have the luminance level of 0% as long as they have a low luminance level on the entire surface or in an area in which the occupation rate with respect to the entire surface is no less than a certain rate. The area in which the occupation rate with respect to the entire surface is no less than the certain rate is, for example, an area which is located at a side inner than a boundary part of the display screen in which low luminance cannot be uniformly output based on performances of a display. The boundary part corresponds to the boundary of the display screen, and the width of the part is, for example, a certain percent of the perpendicular width or horizontal width of the display screen. In addition, the luminance level does not need to match the luminance levels of the black parts in the visible light communication image, that is, the luminance levels of the low-luminance parts. Considering a sensitivity of receiving a visible light communication signal, it is desirable that the luminance of the image having a low luminance level on the entire surface be low as much as possible. In addition, any other image may be used in replacement for the above-described full screen black image as long as the image is an image (identification image) having a luminance which is uniformly lower than the average luminance of the image which is included in a video signal and displayed. For example, it is also good to use an image having a checkerboard pattern or a striped pattern in replacement for a full screen black image, it is desirable that the image be an image in which the occupation rate of low-luminance pixels with respect to the entire display screen is no less than a certain occupation ratio.

In addition, although the visible light communication image is displayed repeatedly in a certain period in this embodiment, it is also good to display a visible light communication image and a complementary image (obtained therefrom by reversing black and white).

Figure 10A:
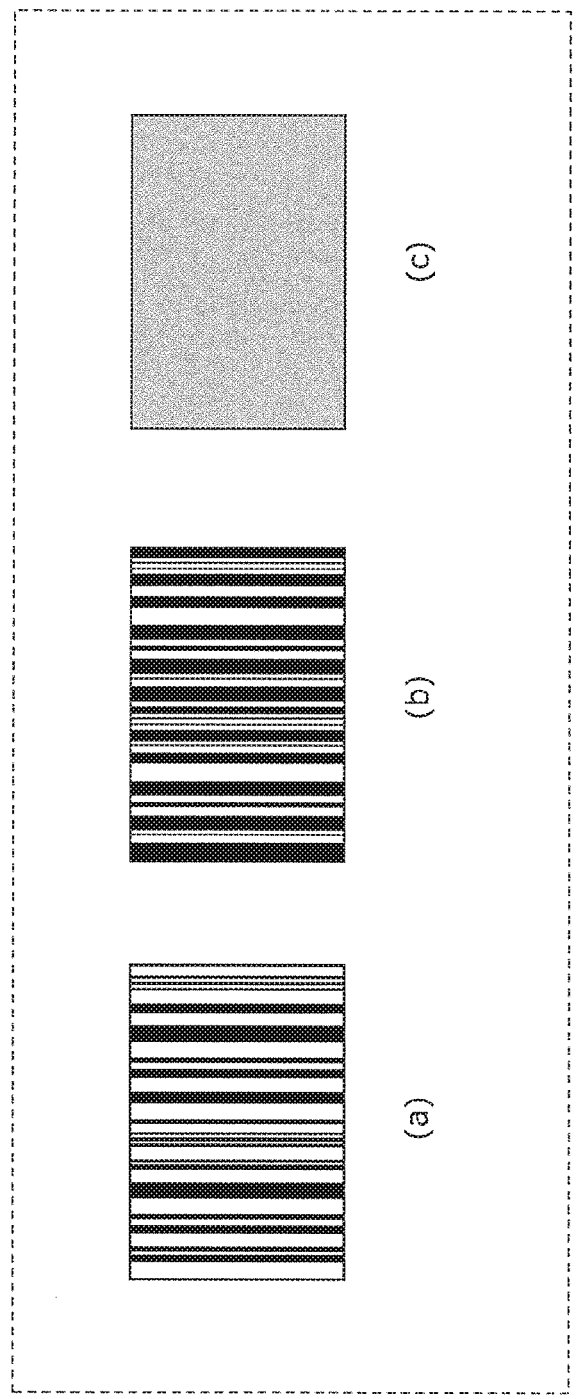
FIG. 10A is a diagram illustrating other examples of visible light communication images according to the embodiment.

FIG. 10A is a diagram illustrating an example of a complementary image in this embodiment.

The display device 100 may sequentially display a visible light communication image illustrated in (a) of FIG. 10A, and a complementary image obtained from the visible light communication image by reversing black and white, that is, a visible light communication image illustrated in (b) of FIG. 10A. By doing so, as illustrated in (c) of FIG. 10A, only an image having an average luminance is recognized by human eyes. Thus, recognition of striped-pattern images is less recognized, and only light and dark contrast is decreased more or less. The black expression and white expression are not limited to 100% and 0%, respectively, and may be at a comparatively high luminance level or a comparatively low luminance level. In addition, whereas restrictions etc. on the receiving device 200 side are reduced when the difference between luminance levels is large, the luminance of an average signal increases. This causes bad effects that light and dark contrast is reduced, a signal image is more noticeable, etc. In view of this, it is desirable to select appropriate levels taking all things into consideration. In addition, it is also good to divide, into two, a subframe in a frame or a time segment in which a visible light communication image is displayed, and use a pair of an image and a complementary image obtained from the image by reversing black and white.

Figure 10B:
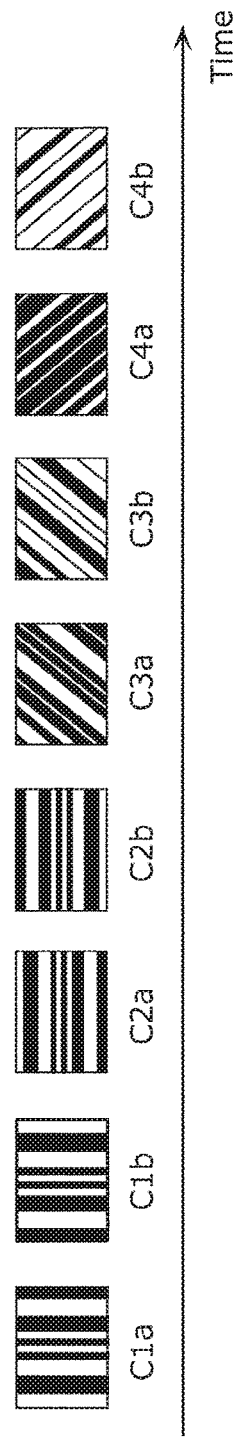
FIG. 10B is a diagram for illustrating operations performed by the display device according to the embodiment.

FIG. 10B is a diagram for illustrating how the display device according to this embodiment performs an operation of displaying a plurality of visible light communication images including a complementary image.

As illustrated in FIG. 10B for example, the display device 100 may sequentially or intermittently display: a visible light communication image C1a having a pattern of vertical stripes; a visible light communication image C1b which is an image obtained by reversing luminance levels (black and white) of the visible light communication image C1a; a visible light communication image C2a having a pattern of horizontal stripes; a visible light communication image C2b which is an image obtained by reversing luminance levels (black and white) of the visible light communication image C2a; a visible light communication image C3a having a pattern of diagonal stripes; a visible light communication image C3b which is an image obtained by reversing luminance levels (black and white) of the visible light communication image C3a; a visible light communication image C4a having a pattern of diagonal stripes opposite in direction to the diagonal stripes in the pattern of the visible light communication image C3a; and a visible light communication image C4b which is an image obtained by reversing luminance levels (black and white) of the visible light communication image C4a.

In addition, white may be white presented by displaying all of RGB. In particular, as a method for reducing luminance, it is also good to reduce the luminance of a high-luminance parts of stripes using a color other than white. In addition, in order to make the stripes less noticeable, black here means a color having low luminance. The black may be black presented using all of RGB, or may not be black presented by causing all of the RGB to be a non-display state. Although the above striped patterns are formed with high-luminance parts and low-luminance parts, it is also good to present a striped pattern using R and G or the like that can divide, when used in combination, the striped pattern into different-color parts. Alternatively, a combination of complementary colors such as R and C may be used. A combination of an image presented by two complementary colors and a complementary image obtained from the image by reversing the complementary colors may be used in the same manner as in the case of black-and-white images. At this time, there is a need to use the receiving device 200 mounting an image sensor and software which support RGB separation in imaging.

In this way, in the earlier-described third display step in this embodiment, as illustrated in FIG. 10B, the complementary images (C1b, C2b, C3b, and C4b) shown by switching two luminance values or two colors which are mutually different from each other and form the striped patterns of the first visible light communication images (C1a, C2a, C3a, and C4a) are displayed as the second visible light communication images. In addition, each of the striped patterns of the first and second visible light communication images (for example, the visible light communication images C1a and C1b) may be formed using two colors which have a complementary color relationship.

In this way, since the visible light communication images (C1b, C2b, C3b, and C4b) which are displayed repeatedly are displayed as complementary images such as negative images with respect to positive images, it is possible to reduce image flickering that occurs when the visible light communication images are displayed.

These striped patterns may be made unnoticeable by scrolling them on the display screen little by little when displaying them repeatedly. Alternatively, a visible light communication image may be divided into two or more areas and scrolled. At this time, movements may be different in scroll direction, speed, etc., or the areas may be scrolled in synchronization with each other.

In this embodiment, each visible light communication signal is coded and then is output as image data. However, in order to clearly show the boundary between blocks of data, it is also good to insert an image signal as an abnormal frame before and after the boundary. In this way, when two or more image signals in frames are successfully recognized, it is possible to determine that signals of one block have been obtained, and determine the size of the signals of one block in the image.

According to this embodiment, there is a need to complete a sequence of signals within a single image in the image sensor at the receiving device 200 side. However, when the amount of information is large, it is also good to write information in the header part of a visible light communication signal. For example, the information includes information indicating whether information included in the visible light communication image is stored at the beginning of the visible light communication signal or any other part, and information indicating that a visible light communication signal is divided into several segments because the amount of information is large and the ordinal position of the segment at which the information in the visible light communication image is included. As a specific example, the use of preamble and type parts according to the JEITA-CP1222 standard makes it possible to divide the information into several images. As a matter of course, methods for dividing the information, outputting a division signal, and housing the division information in the image are not limited to the example. In addition, there is a method for displaying a visible light communication image repeatedly when communicating the visible light communication signal reliably. At this time, there is a method for repeatedly displaying an image based on one signal obtained by dividing the visible light communication signal, and then repeatedly displaying an image based on a signal next to the one signal. In addition, there is a method for sequentially displaying images based on a sequence of signals generated through such division, and repeatedly displaying them as a set. One of these display methods can be selected depending on the amount of information and the kind of a normal video signal.

As described above, when outputting a visible light communication image and a complementary image thereof are output in a comparatively short time interval, due to restrictions on time resolutions of human eyes, the striped patterns of the images disappear and become equivalent to a uniform image having an average luminance. Here, the display interval of these two images is described.

Figure 11:
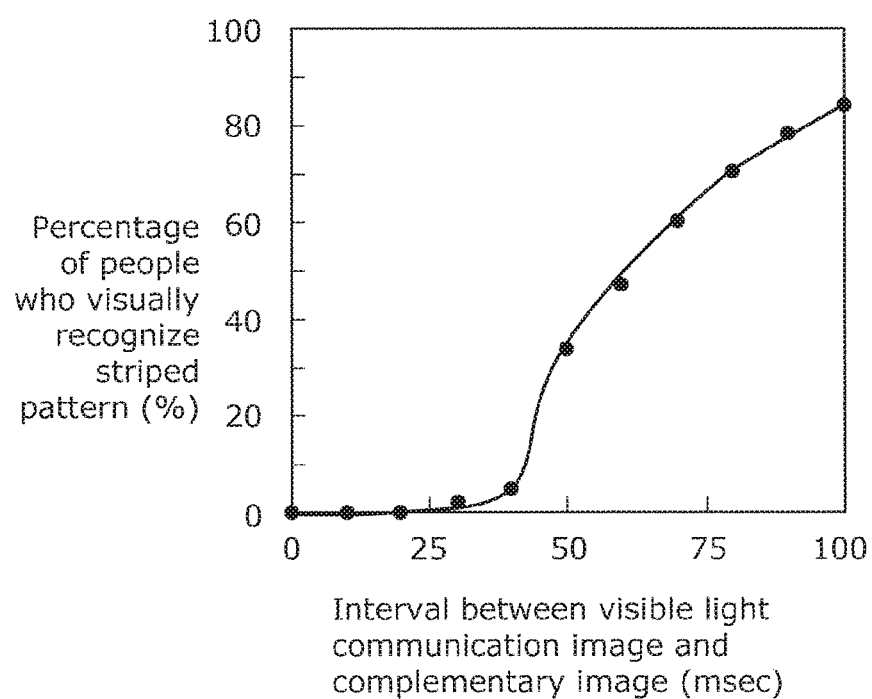
FIG. 11 is a diagram illustrating the relationship of the time intervals between visible light communication images and complementary images and striped pattern recognition rates.

FIG. 11 is a diagram illustrating the relationship of the display intervals between visible light communication images and complementary images and the percentage of people who can see striped patterns (striped pattern recognition percentage).

It is generally known that the time resolutions of human eyes dramatically decrease around 50 milliseconds as a threshold value. As illustrated in FIG. 11, according to the intervals between the visible light communication images and the complementary images, the recognition rates of the striped patterns of images change. The graph illustrated in FIG. 11 shows the result of experimentally testing the relationships between the time intervals and the percentages of the people who can see the striped patterns. In the test, full screen black display is performed. The stripes are horizontal stripes with a pitch of 3 mm, and the people who visually recognize the stripes and the display screen on which the image is displayed are apart by 1 m. As a result, as is known conventionally, the percentage of the people who can see the striped pattern dramatically rises around 50 milliseconds. Therefore, it is desirable to set the intervals between the visible light communication images and the complementary images to be no more than 50 milliseconds. In addition, around 20 milliseconds is said to be a limitation at which it is almost impossible to visually recognize the stripes, and thus it is further desirable to set the intervals to be no more than 20 milliseconds. As a result, in a normal video which is output at 60 frames per second, it is undesirable to set an interval of four frames or more as the interval between a visible light communication image and a complementary image thereof. It is further desirable to output these images within a frame.

In this way, in the earlier-described third display step in this embodiment, the second visible light communication image is displayed such that the display interval of 20 milliseconds or more is set as the interval between the first visible light communication image and the second visible light communication image. In this way, it is possible to make the visible light communication images unnoticeable to human eyes, thereby reducing the influence of the visible light communication images onto the video signal images.

Figure 12:
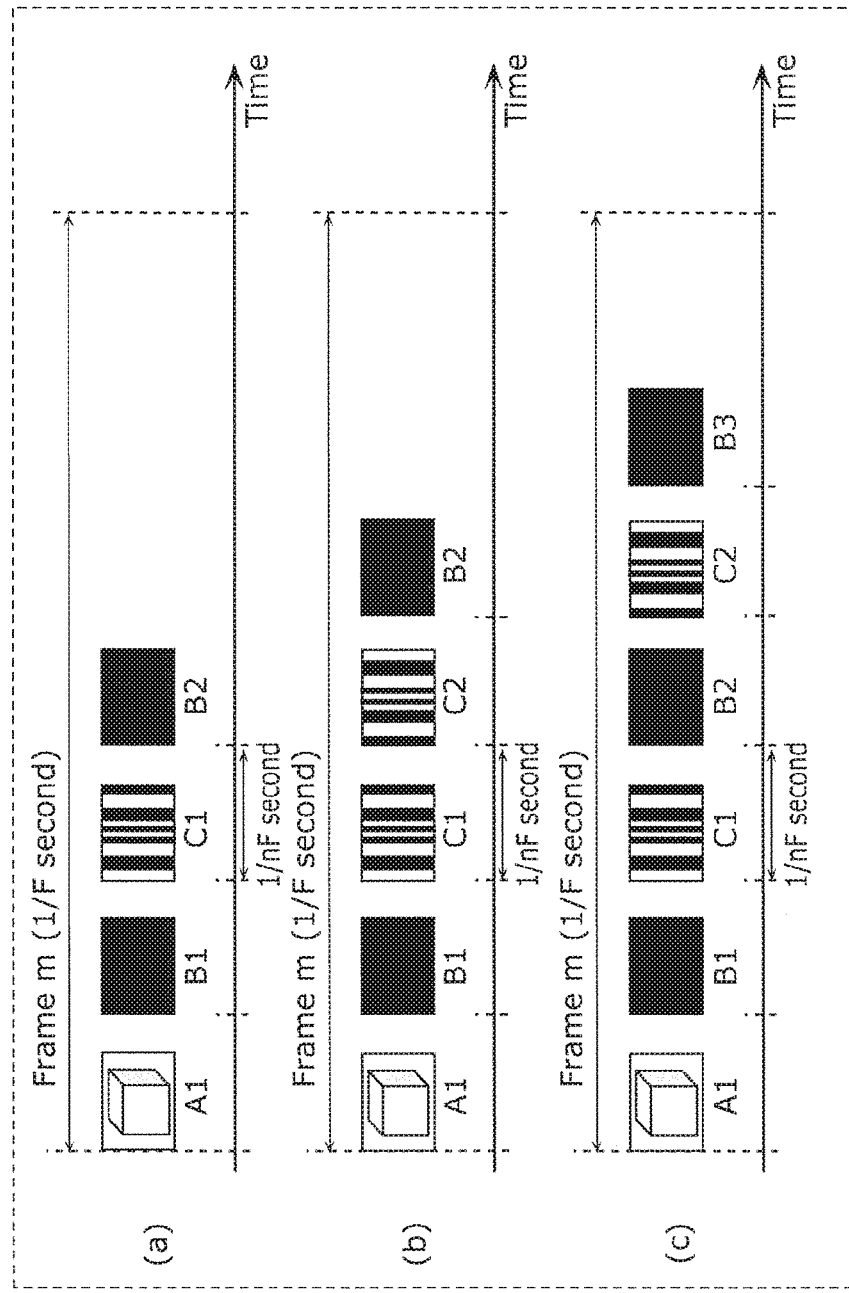
FIG. 12 is a diagram for illustrating an operation of the display device according to the embodiment.

FIG. 12 is a diagram illustrating another example of a method for displaying visible light communication images and full screen black images in this embodiment.

For example, as illustrated in (a) of FIG. 12, the display unit 110 of the display device 100 may display, in the m-th frame, an image (video) A1, a full screen black image B1, a visible light communication image C1, and a full screen black image B2 included in a video signal in this order. More specifically, the display control unit 140 of the display device 100 causes the display unit 110 to display the video A1 in the subframe which firstly appears in the m-th frame, and to display the full screen black image B1 in the next subframe. Subsequently, the display control unit 140 causes the display unit 110 to display the visible light communication image C1 in the further next subframe included in the m-th frame, and to display the full screen black image B2 in the next subframe.

In this way, the visible light communication image C1 is displayed temporally between the full screen black images B1 and B2. Thus, the receiving device 200 can appropriately receive the visible light communication signal of the visible light communication image C1.

In addition, as illustrated in (b) of FIG. 12, the display unit 110 of the display device 100 may display, in the m-th frame, a video A1, a full screen black image B1, a visible light communication image C1, a visible light communication image C2 which is a complementary image of the visible light communication image C1, and a full screen black image B2 in this order. More specifically, the display control unit 140 of the display device 100 causes the display unit 110 to display the video A1 in the subframe which firstly appears in the m-th frame, and to display the full screen black image B1 in the next subframe. Subsequently, the display control unit 140 causes the display unit 110 to display the visible light communication image C1 in the further next subframe included in the m-th frame, and to display, in the next subframe, the visible light communication image C2 which is the complementary image obtained by reversing black and white of the visible light communication image C1. Subsequently, the display control unit 140 causes the display unit 110 to display the full screen black image B2 in the further next subframe included in the m-th frame.

In this way, since the visible light communication images C1 and C2 which are mutually complementary images are displayed sequentially, it is possible to make the striped patterns of the images unnoticeable.

In addition, as illustrated in (c) of FIG. 12, the display unit 110 of the display device 100 may display, in the m-th frame, a video A1, a full screen black image B1, a visible light communication image C1, a full screen black image B2, a visible light communication image C2 which is a complementary image of the visible light communication image C1, and a full screen black image B3 in this order. More specifically, the display control unit 140 of the display device 100 causes the display unit 110 to display the video A1 in the subframe which firstly appears in the m-th frame, and to display the full screen black image B1 in the next subframe. Subsequently, the display control unit 140 causes the display unit 110 to display the visible light communication image C1 at the further next subframe included in the m-th frame, and to display the full screen black image B2 in the next subframe. Subsequently, the display control unit 140 of the display device 100 causes the display unit 110 to display, in the further next subframe included in the m-th frame, the visible light communication image C2 which is the complementary image obtained by reversing black and white of the visible light communication image C1 which has been already displayed, and to display the full screen black image B3 in the further next subframe.

In this way, each of the visible light communication images C1 and C2 is displayed temporally between the full screen black images. Thus, the receiving device 200 can appropriately receive the visible light communication signal of the corresponding one of the visible light communication images C1 and C2. Furthermore, since the visible light communication images C1 and C2 which are mutually complementary images are displayed sequentially, it is possible to make the striped patterns of the images unnoticeable.

In this way, the display method in this embodiment further includes: a first re-display step of re-displaying the identification image (B2) after the first visible light communication image (C1) is displayed and before the second visible light communication image (C2) is displayed. In this way, since the identification image (B2) is displayed between when the first visible light communication image (C1) is displayed and when the second visible light communication image (C2) is displayed, the receiving device 200 can receive the visible light communication signal of the first visible light communication image (C1) and the visible light communication signal of the second visible light communication image (C2) in an appropriately separated manner.

Furthermore, the display method in this embodiment further includes: a second re-display step of re-displaying the identification image (B3) after the second visible light communication image (C2) is displayed. In this way, in the earlier-described imaged image, it is possible to distinguish the end position of the visible light communication signal of the second visible light communication image (C2), and thus appropriately transmit the visible light communication signal.

Furthermore, in the first or second re-display step in this embodiment, the identification images (B2 and B3) are re-displayed in a predetermined frame, for a period shorter than the predetermined frame. In this way, it is possible to make the identification images (B2 and B3) unnoticeable, and to reduce the influence of the identification images (B2 and B3) onto the video signal image.

Figure 13:
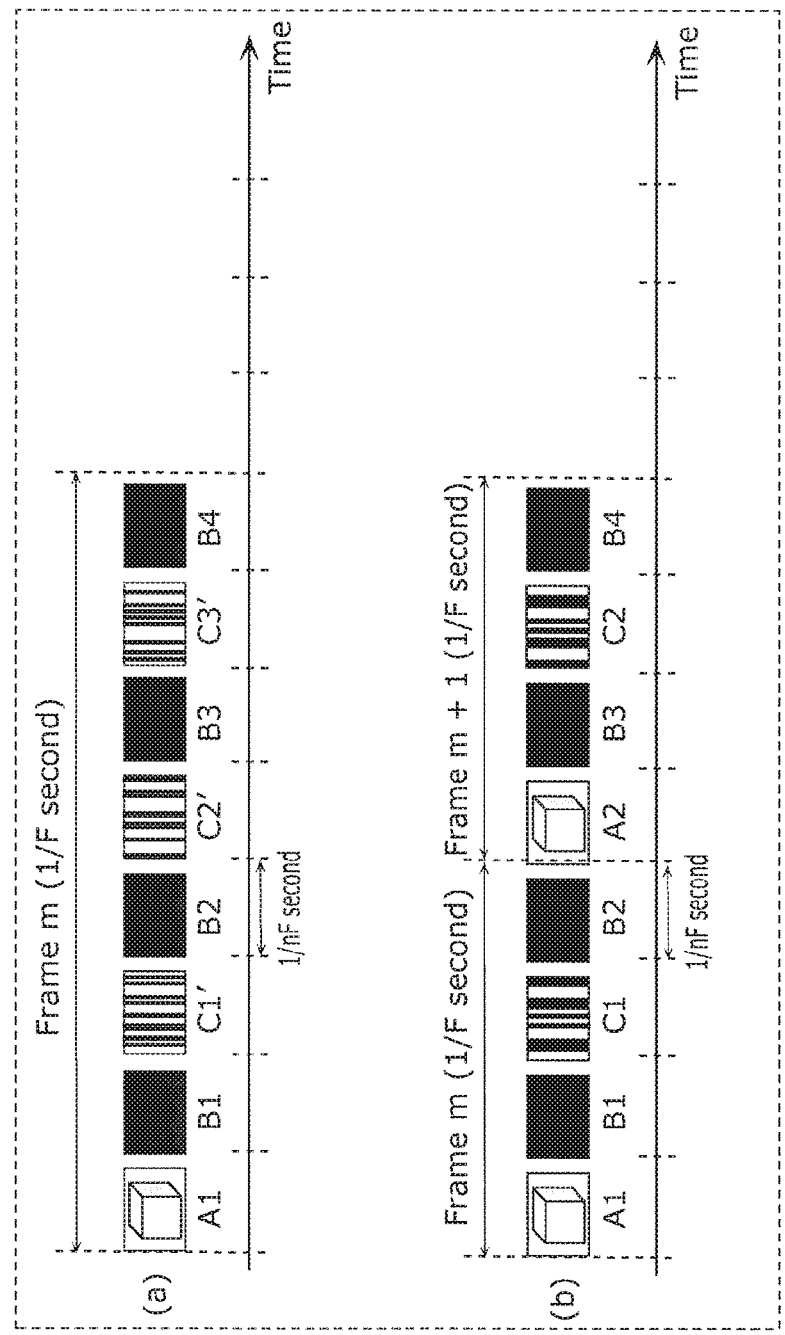
FIG. 13 is a diagram for illustrating operations performed by the display device according to the embodiment.

FIG. 13 is a diagram illustrating another example of a method for displaying visible light communication images and full screen black images in this embodiment.

As illustrated in (a) of FIG. 13, the display unit 110 of the display device 100 may display, in the m-th frame, a video A1, a full screen black image B1, a visible light communication image C1', a full screen black image B2, a visible light communication image C2', a full screen black image B3, a visible light communication image C3', and a full screen black image B4 in this order. Here, the visible light communication images C1', C2', and C3' are in a relationship similar to the relationship between the respective visible light communication images presented as (a) and (b) of FIG. 10A. When these images are displayed, only spatially uniform images are recognized by people without visual recognition of the stripes of these images. Stated differently, the visible light communication images C1', C2', and C3' are in the relationship in which the values obtained by integrating the luminance values corresponding among the three images are uniform (this relationship is hereinafter referred to as a uniform relationship).

More specifically, the display control unit 140 of the display device 100 causes the display unit 110 to display the video A1 in the subframe which firstly appears in the m-th frame, and to display the a full screen black image B1 in the next subframe. Subsequently, the display control unit 140 causes the display unit 110 to display the visible light communication image C1' in the further next subframe included in the m-th frame, and to display the full screen black image B2 in the further next subframe. Subsequently, the display control unit 140 of the display device 100 causes the display unit 110 to display, in the further next subframe included in the m-th frame, the visible light communication image C2' which is in the above-described uniform relationship with the visible light communication image C1' which has been already displayed, and to display the full screen black image B3 in the further next subframe. Subsequently, the display control unit 140 of the display device 100 causes the display unit 110 to display, in the further next subframe included in the m-th frame, the visible light communication image C3' which is in the above-described uniform relationship with the visible light communication images C1' and C2' which have been already displayed, and to display the full screen black image B4 in the further next subframe.

In this way, each of the visible light communication images C1', C2', and C3' is displayed temporally between corresponding ones of the full screen black images. Thus, the receiving device 200 can appropriately receive the visible light communication signals of the respective visible light communication images C1', C2', and C3'. Furthermore, since the visible light communication images C1', C2', and C3' in the uniform relationship are displayed, it is possible to make the striped patterns of the images unnoticeable. Although the respective visible light communication images C1', C2', and C3' are presented in black and white, they may be presented in two colors which have a complementary color relationship instead of black and white.

In addition, as illustrated in (b) of FIG. 13, the display unit 110 of the display device 100 may display the visible light communication image C1 in the m-th frame, and may display, in the (m+1)-th frame, the visible light communication image C2 corresponding to the visible light communication image C1. More specifically, the display unit 110 displays, in the m-th frame, the video A1, the full screen black image B1, the visible light communication image C1, and the full screen black image B2 in this order. Furthermore, the display unit 110 displays, in the (m+1)-th frame, the video A2, the full screen black image B3, the visible light communication image C2, and the full screen black image B4 in this order. These images are included in the earlier-described video signal.

More specifically, the display control unit 140 of the display device 100 causes the display unit 110 to display the video A1 in the subframe which firstly appears in the m-th frame, and to display the full screen black image B1 in the next subframe. Subsequently, the display control unit 140 causes the display unit 110 to display the visible light communication image C1 at the further next subframe included in the m-th frame, and to display the full screen black image B2 in the next subframe. Subsequently, the display control unit 140 of the display device 100 causes the display unit 110 to display the video A2 in the subframe which appears firstly in the (m+1)-th frame different from the m-th frame, and to display the full screen black image B3 in the further next subframe. Subsequently, the display control unit 140 of the display device 100 causes the display unit 110 to display, in the further next subframe included in the (m+1)-th frame, the visible light communication image C2 which is the complementary image obtained by reversing black and white of the visible light communication image C1 which has been already displayed, and to display the full screen black image B4 in the further next subframe.

In this way, since the visible light communication images C1 and C2 which are mutually complementary images are displayed in different frames, it is possible to improve light and dark contrast within each frame.

Figure 14:
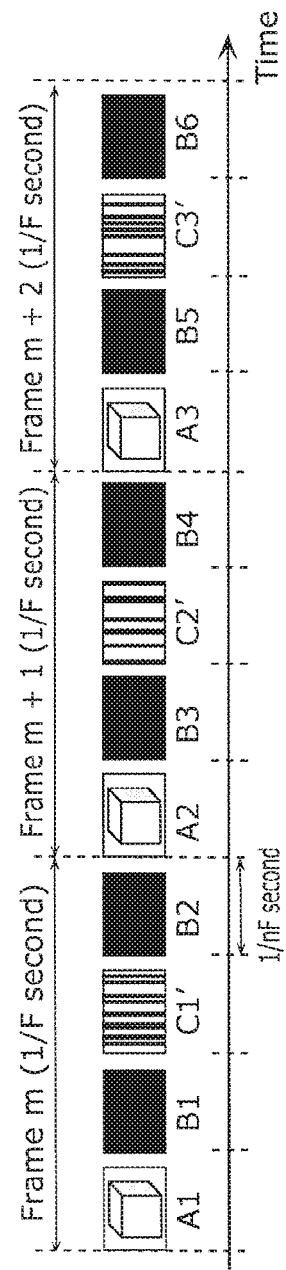
FIG. 14 is a diagram for illustrating operations performed by the display device according to the embodiment.

FIG. 14 is a diagram illustrating another example of a method for displaying visible light communication images and full screen black images in this embodiment.

As illustrated in FIG. 14, the display unit 110 of the display device 100 may display the visible light communication image C1' in the m-th frame, display, in the (m+1)-th frame, the visible light communication image C2' which is in the above-described uniform relationship with the visible light communication image C1', and display, in the (m+2)-th frame, the visible light communication image C3' which is in the above-described uniform relationship with the visible light communication images C1' and C2'. Stated differently, the display unit 110 displays, in the m-th frame, the video A1, the full screen black image B1, the visible light communication image C1', and the full screen black image B2 in this order, and displays, in the (m+1)-th frame, the video A2, the full screen black image B3, the visible light communication image C2', and the full screen black image B4 in this order. Furthermore, the display unit 110 displays, in the (m+1)-th frame, the video A3, the full screen black image B5, the visible light communication image C3', and the full screen black image B6 included in the earlier-described video signal in this order.

More specifically, the display control unit 140 of the display device 100 causes the display unit 110 to display the video A1 in the subframe which firstly appears in the m-th frame, and to display the full screen black image B1 in the next subframe. Subsequently, the display control unit 140 causes the display unit 110 to display the visible light communication image C1' in the further next subframe included in the m-th frame, and to display the full screen black image B2 in the further next subframe. Subsequently, the display control unit 140 of the display device 100 causes the display unit 110 to display the video A2 in the subframe which appears firstly in the (m+1)-th frame different from the m-th frame, and to display the full screen black image B3 in the further next subframe. Subsequently, the display control unit 140 of the display device 100 causes the display unit 110 to display, in the further next subframe included in the (m+1)-th frame, the visible light communication image C2' which is in the above-described uniform relationship with the visible light communication image C1' which has been already displayed, and to display the full screen black image B4 in the further next subframe.

Subsequently, the display control unit 140 of the display device 100 causes the display unit 110 to display the video A3 in the subframe which appears firstly in the (m+2)-th frame different from the (m−+1)-th frame, and to display the full screen black image B5 in the further next subframe. Subsequently, the display control unit 140 of the display device 100 causes the display unit 110 to display, in the further next subframe included in the (m+2)-th frame, the visible light communication image C3' which is in the above-described uniform relationship with the visible light communication images C1' and C2' which have been already displayed, and to display the full screen black image B6 in the further next subframe.

In this way, with the full screen black images, the receiving device 200 is capable of appropriately receiving the visible light communication signal of each of the visible light communication images C1', C2', and C3'. Furthermore, since the visible light communication images C1', C2', and C3' which are in the uniform relationship are displayed, it is possible to make the striped patterns of the images unnoticeable. Furthermore, it is possible to improve the light and dark contrast in each frame.

In addition, the receiving device 200 may control exposure time considering high frequency noises in luminance of a light source such as a surrounding lighting device and exposure time.

Figure 15:
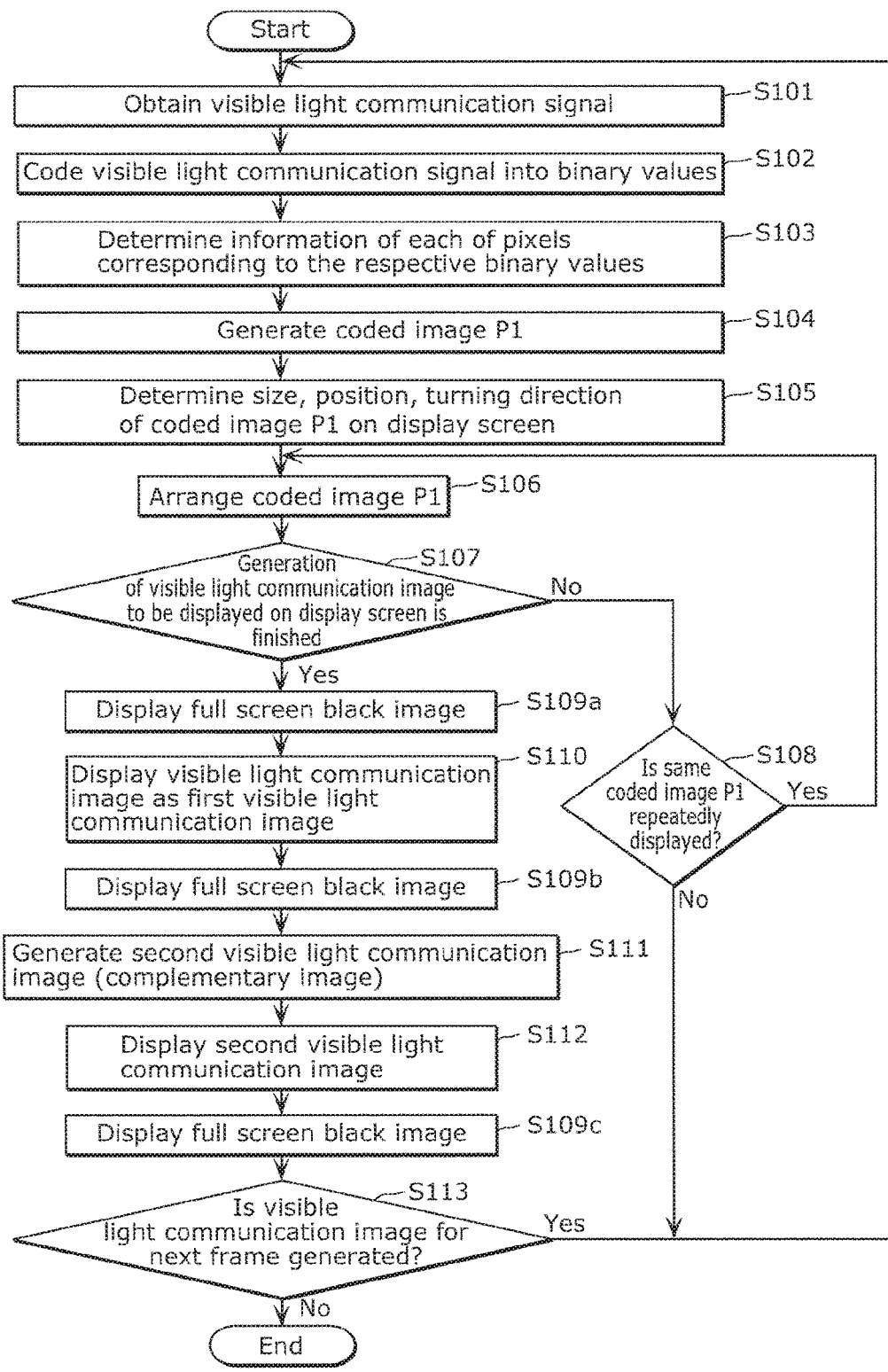
FIG. 15 is a flowchart of a procedure for displaying a visible light communication image described in the embodiment.

FIG. 15 is a flowchart of a procedure for displaying a visible light communication image described in this embodiment. As illustrated in FIG. 15, the second signal processing unit 160 of the display device 100 firstly obtains a visible light communication signal from the second input unit 150 (Step S101). Next, the second signal processing unit 160 codes the visible light communication signal into binary values (Step S102). Furthermore, the second signal processing unit 160 determines information of each of pixels corresponding to the respective binary values (Step S103). It is to be noted that the information of each pixel is at least one of color (including black and white) and brightness. In addition, the second signal processing unit 160 may obtain such information from outside instead of determining the information of the pixel. The second signal processing unit 160 generates a coded image P1 which is a basic form based on the information (Step S104). Next, the second signal processing unit 160 determines the area of the coded image P1 which is arranged on the display screen of the display unit 110, specifically, the size, position, turning direction etc. of the coded image P1 (Step S105). It is to be noted that the second signal processing unit 160 may obtain the information about the size, position, turning direction etc. from outside, or may determine a predetermined size, position, turning direction etc.

Next, the second signal processing unit 160 arranges the coded image P1, based on the determined size, position, turning direction etc. (Step S106). For example, the second signal processing unit 160 expands or shrinks the coded image P1 along at least one of the directions parallel and vertical to the stripes in the pattern of the coded image P1, or turns the coded image P1.

Next, the second signal processing unit 160 determines whether or not generation of the visible light communication image to be displayed on the display screen of the display unit 110 is finished, based on the arrangement of the coded image P1 in Step S106 (Step S107). Here, when it is determined that the generation is not finished, the second signal processing unit 160 determines whether or not to repeatedly display the same coded image P1 (Step S108). When determining not to repeatedly display the same coded image P1 (No in Step S108), the second signal processing unit 160 repeatedly executes the processes starting with Step S101. Stated differently, the second signal processing unit 160 obtains another visible light communication signal and perform the processing similar to the one described earlier on the other visible light communication signal, thereby generating and arranging the other coded image P1. Meanwhile, when determining to repeatedly display that the same coded image P1 (Yes in Step S108), the second signal processing unit 160 repeatedly executes the processes starting with Step S106. At this time, the second signal processing unit 160 expands, shrinks, or turns the same coded image P1, based on the size, position, turning direction determined in Step S105.

In addition, in Step S107, when the second signal processing unit 160 determines that generation of the visible light communication image is finished (Yes in Step S107), the generated visible light communication image is determined to be the first visible light communication image. Subsequently, the display control unit 140 causes the display unit 110 to display a full screen black image having predetermined brightness for a predetermined time period (Step S109a). The display control unit 140 causes the display unit 110 to display the generated visible light communication image as the first visible light communication image (Step S110). At this time, the display unit 110 displays the final first visible light communication image for the predetermined time period. Subsequently, the display control unit 140 causes the display unit 110 to display a full screen black image having predetermined brightness for a predetermined time period (Step S109b). In addition, the second signal processing unit 160 generates, as a second visible light communication image, a complementary image obtained by switching two mutually different luminance values or colors which form the striped pattern of the first visible light communication image (Step S111). Subsequently, the display control unit 140 causes the display unit 110 to display the second visible light communication image generated by the second signal processing unit 160 (Step S112). Furthermore, the display control unit 140 causes the display unit 110 to display a full screen black image having predetermined brightness for a predetermined time period (Step S109c). In the respective steps (S109a, S109b, and S109c) in which the full screen black images are displayed, the brightness of the respective full screen black images or time periods in which the respective full screen black images may be the same or different. In addition, Step S111 is performed between Step S109b and Step S112, but may be performed at other timing. For example, the timing in Step S111 corresponding to a time period in which the second visible light communication image is generated may be after when it is determined, in Step S107, that the generation of the visible light communication image is finished (Yes in Step S107). In this way, the timing in Step S111 may be a time period within a time period that lasts until the second visible light communication image is displayed on the display unit 110 in Step S112.

Next, the second signal processing unit 160 determines whether or not to generate a visible light communication image for the next frame (Step S113). Here, when determining to generate it (Yes in Step S113), the second signal processing unit 160 repeatedly executes the processes starting with Step S101. It is to be noted that Steps S109a, S109b, S109c, S111, and S112 may be performed or may not be performed. In addition, it is desirable that the second signal processing unit 160 adjust the size of the coded image P1 such that the minimum unit of binary data corresponds to an integral multiple of a pixel when expanding or shrinking the coded image P1 in the direction perpendicular to the stripes in the pattern of the coded image P1. In addition, each of the generated first and second visible light communication images does not have to be arranged in the entire area of the display screen of the display unit 110. In other words, the display screen of the display unit 110 may have an area in which no visible light communication image is arranged, stated differently, an area to which no signal is transmitted. At this time, the display control unit 140 adjusts the luminance of the area to which no signal is transmitted as much as possible irrespective of whether the first visible light communication image is displayed or the second visible light communication image is displayed.

Figure 16:
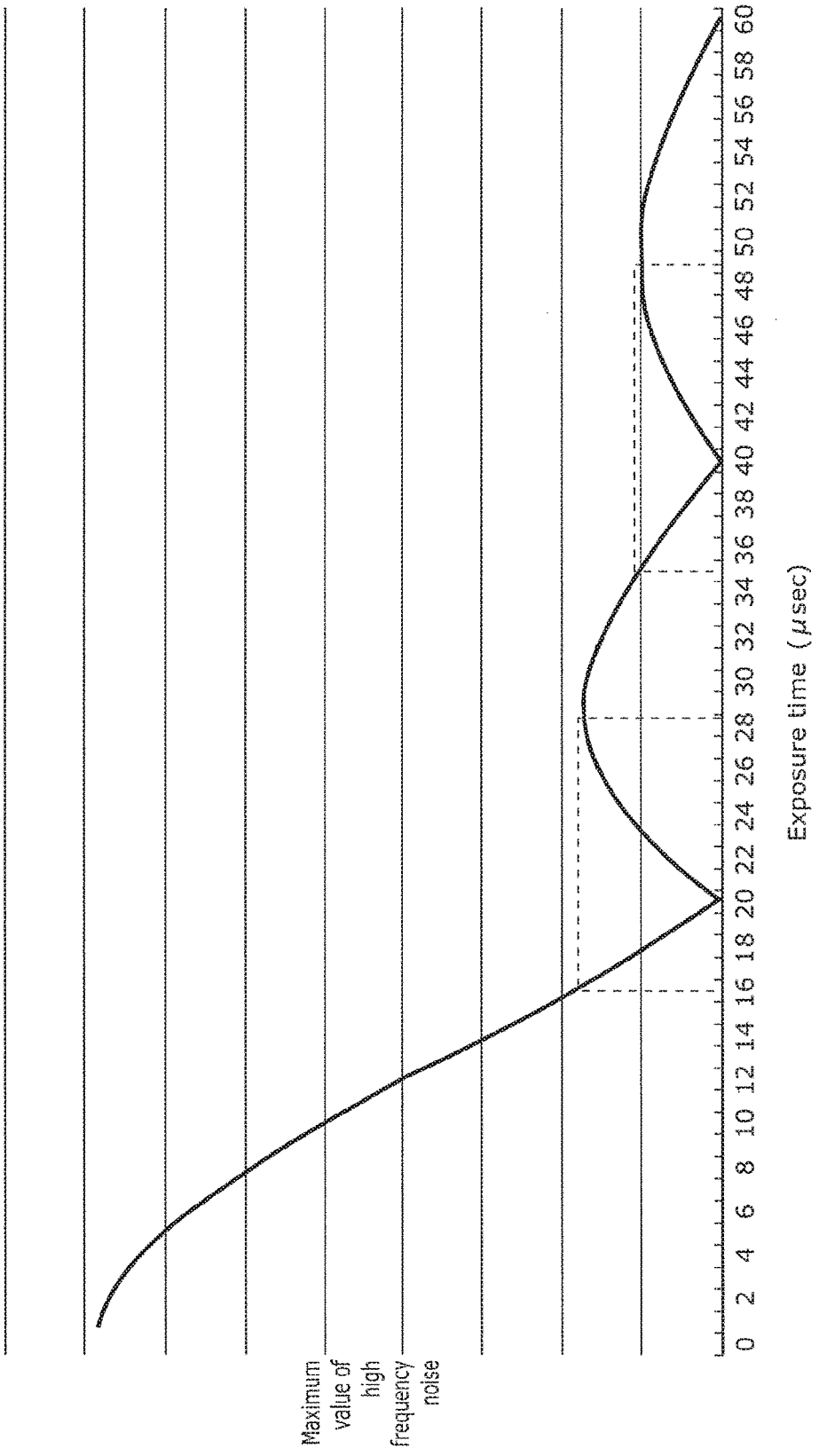
FIG. 16 is a diagram illustrating the relationships between high frequency noises in luminance of a light source such as a surrounding lighting device and exposure time.

FIG. 16 illustrates the relationships between high frequency noises in luminance of a light source such as a surrounding lighting device and exposure time in the case where the light source has a high-frequency noise period of 20 microseconds. As exposure time is larger with respect to a high-frequency noise period, an imaged image is less affected by the high-frequency noise, which makes it easier to estimate a light source luminance. The influence of a high-frequency noise disappears when the exposure time is an integer multiple of a high-frequency noise period. At this time, a visible light communication signal is most easy to be received. High-frequency noises mainly stem from switching power source circuits, and most of switching power sources for electric light have a high-frequency noise period of 20 microseconds or less. Thus, it is possible to estimate a light source luminance easily by setting exposure time no less than 20 microseconds.

In addition, the present disclosure may be implemented such that the visible light communication image is inserted in a normal video. In this case, the visible light communication signal is received at a limited part of the display unit, which places a restriction on the relationship between the receiving device 200 and the display screen. On the other hand, this can be solved by displaying, in the video signal, an image for guiding the receiving device 200 at the limited part of the display screen. This embodiment has described the method for unnoticeably inserting the visible light communication image. However, since the area here is a limited area, contrivance for making the striped pattern of a signal unnoticeable may be reduced. As a matter of course, the method for making the striped pattern unnoticeable as much as possible may be performed, or may not be performed. In addition, it is also good to display a visible light communication image not for an extremely short time (for example, 1 millisecond or less) but continuously or for comparatively long time, and to receive the visible light communication image in the same manner as the method described above. At this time, a receiving error (imaging error) probability is significantly reduced, and a restriction requiring repetitive transmission is reduced.

Although a display for displaying a video as the display device 100 is taken as an example in this embodiment, it is to be noted that the display device 100 may be a device such as a projector for projecting a video.

Figure 17:
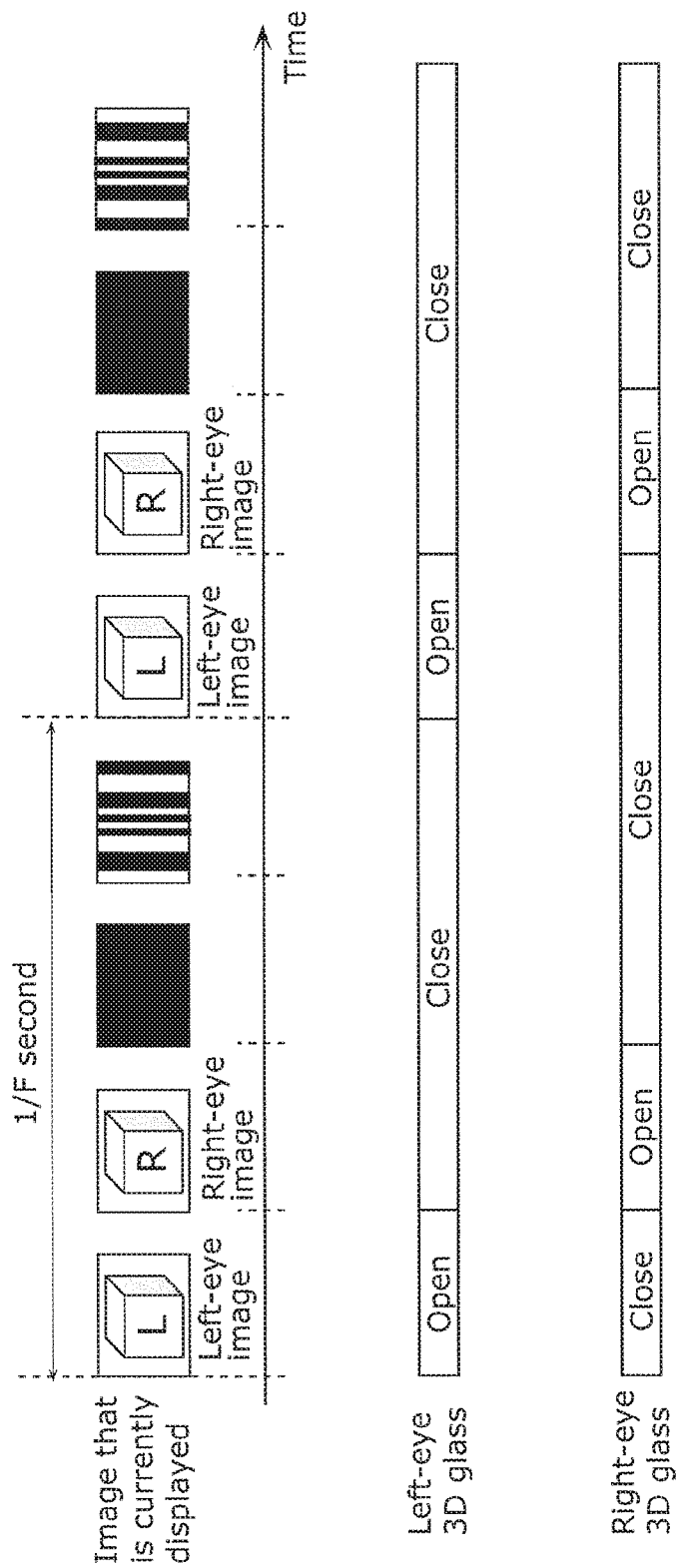
FIG. 17 is a diagram illustrating an example in which the display method according to the embodiment is applied to a 3D display system.

FIG. 17 is a diagram illustrating an example of applying the display device 100 in this embodiment to a 3D video.

It is also good to apply the display device 100 to glass-type 3D videos which have been used in various videos. In this case, the display device 100 does not output the visible light communication image to any of the right and left eyes, at least at the same timing as the timing when the video signal (left-eye image or right-eye image) is displayed. By closing the shutters of eye-glass parts for both eyes for a period in which the visible light communication image is displayed, a viewer can visually recognize the video naturally.

In addition, since the visible light communication image is displayed continuously or for the comparatively long time in this embodiment, when the visible light communication image is recognized by human eyes, the imaging unit included in the receiving device may not be an image sensor in rolling shutter mode as long as it is an image sensor such as a CCD image sensor.

Although the method for performing visible light communication using the display device 100 in this embodiment, a billboard lighting device etc. can perform visible light communication using a similar method.

Figure 18:
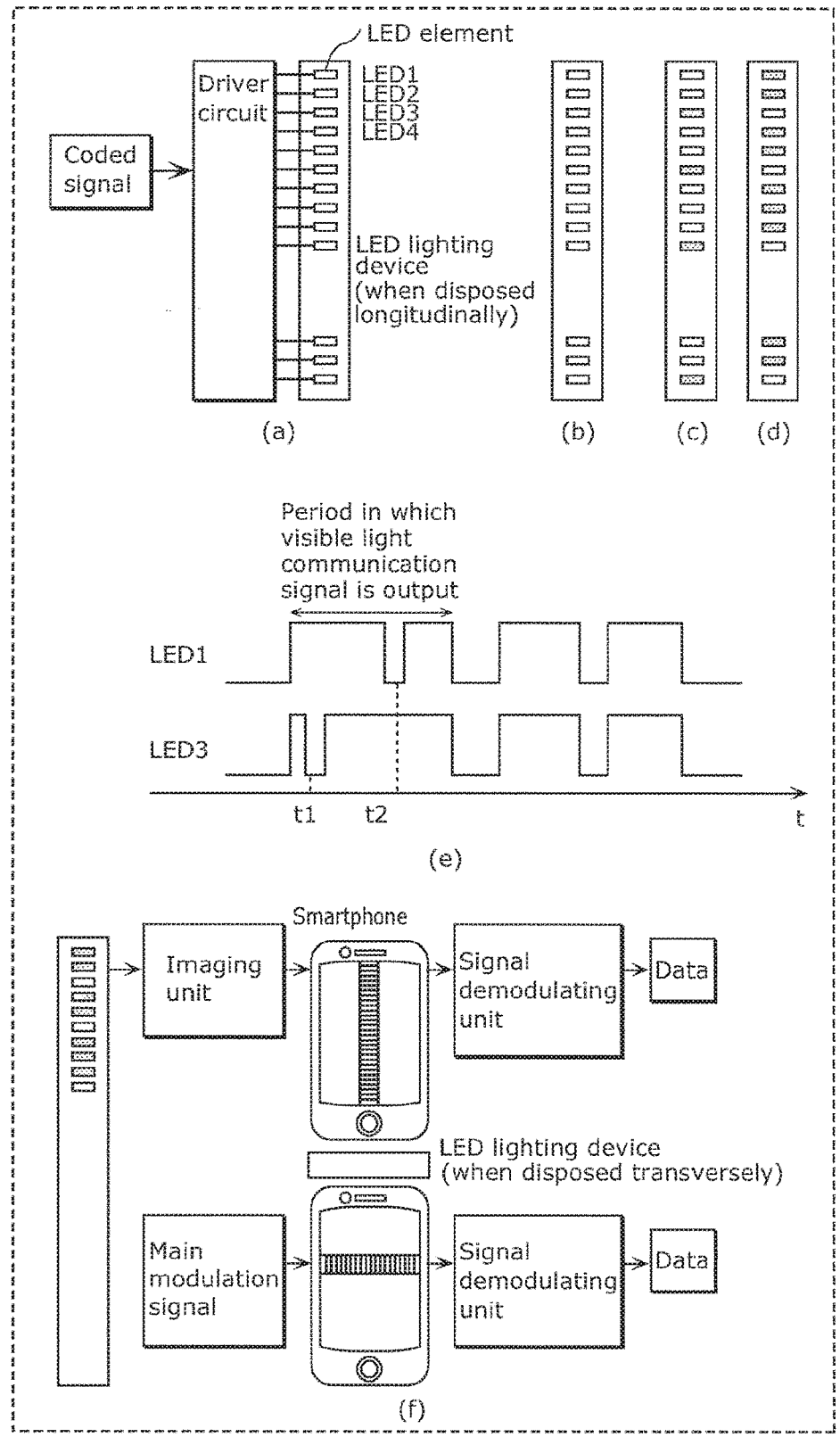
FIG. 18 is a diagram illustrating an example in which the display method according to the embodiment is applied to a lighting device.

FIG. 18 is a diagram illustrating an example of the lighting device in which a plurality of LEDs are arranged in the perpendicular direction and signals for driving the same.

As illustrated in (a) of FIG. 18, the display device is, for example, the lighting device in which the plurality of LEDs are arranged in the perpendicular direction. Each of the LED elements corresponds to the minimum unit of horizontal stripes obtained by coding the visible light communication signal, and corresponds to a coded ON or OFF signal. Since the display device is the lighting device, to prevent change in brightness depending on the visible light communication signal, it is also good to transmit visible light communication signals illustrated in (c) and (d) of FIG. 18 in a period in which a visible light communication signal is output, in addition to a normal visible light communication signal illustrated in (b) of FIG. 18. The visible light communication signals illustrated in (c) and (b) of FIG. 18 are presented by light and dark contrast patterns of light of the respective LEDs arranged in the perpendicular direction. Furthermore, the light portions and dark portions (switching ON and OFF) are reverted between the visible light communication signals.

In FIG. 18, (e) illustrates the control state of LED1 and LED3 in (a) of FIG. 18. In (e) of FIG. 18, the horizontal axis illustrates time. As illustrated in (e) of FIG. 18, the lighting device outputs the visible light communication signal illustrated in (c) of FIG. 18 at time t1 in the period in which a visible light communication signal is output, and outputs the visible light communication signal illustrated in (d) of FIG. 18 at time t2. In other words, the lighting device controls the respective LEDs so that the LED3 is switched OFF at time t1, and the LED1 is switched OFF at time t2. These operations are repeated at a certain cycle. In this way, the lighting device is also capable of transmitting the visible light communication signals in the same manner as the display device which displays a video. Considering flickering in lighting, it is desirable that the OFF state period at time t1 and t2 be 0.2 millisecond or less.

As above, the embodiment which the Applicants consider as the best mode and other embodiments have been provided based on the detailed descriptions and the drawings. These embodiments are provided to illustrate the subject matter recited in the Claims to those skilled in the art with reference to the particular embodiments. Therefore, the constituent elements recited in the detailed descriptions and the drawings may include not only constituent elements essential for solving the problems but also other constituent elements. Accordingly, just because these dispensable constituent elements are described in the drawings or the detailed descriptions, these inessential constituent elements should not be immediately acknowledged as being essential. Furthermore, within the scope of the Claims and a range equivalent thereto, the above-described embodiments may be subject to various modifications, replacement, addition, omission, etc.

In addition, the present disclosure covers video display devices as below. One of the video display devices includes: a first signal processing unit which divides an input video signal into a plurality of images on a per frame basis; a second signal processing unit which codes the input visible light communication signal to generate a coded image, generates a visible light communication image by repeatedly arranging the coded image at predetermined positions, and determines display timing for displaying the visible light communication image; a display control unit which performs control so that the visible light communication image is inserted between a plurality of images to be output by the first signal processing unit and displayed at a display timing determined by the second signal processing unit; and a display unit which displays the plurality of images to be output by the first signal processing unit under control of the display control unit and the visible light communication image.

In addition, another one of the video display devices is a video display device capable of outputting a visible light communication signal, and includes: a display screen which displays a video; a visible light communication signal control unit which codes the visible light communication signal on the display screen of the display panel based on the video signal to generate images including images having patterns in each of which stripes are visualized according to a certain rule; a display control unit which controls video to be displayed; a unit for synthesizing and controlling a visible light communication signal and a coded image, which mixes the image generated by coding the visible light communication signal into an extremely short time video so as to reorganize a sequence of video signals to be displayed; and a display screen which displays the video signal.

In addition, the second signal processing unit may determine the extremely short time for displaying the visible light communication image to be within 1 millisecond, and desirably within 0.2 millisecond.

In addition, in the image including the image having a striped pattern generated by coding the visible light communication signal, each of the images having a striped pattern is a visible light communication signal in at least one unit. It is also good to output a video including a plurality of images having striped patterns in which stripes are not parallel to any of the peripheral sides of the display screen, are orthogonal to the peripheral sides, or form acute angles with respect to the peripheral sides.

In addition, a visible light communication signal may be coded on the display screen of the display unit, and in succession to the period in which an image having a striped pattern visualized according to a predetermined rule is displayed, an image having a predetermined striped pattern formed using complementary colors may be displayed on the display screen.

In addition, although this embodiment has been described taking the liquid crystal display device as an example of the display device 100, the display device 100 may be applied to a display device of another kind.

Among flat display devices, self-emitting displays such as plasma displays (PDPs), organic EL displays (OLEDs), etc. present video by causing the respective primary color components (which are generally R, G, and B in most cases) to be displayed at a gray level and to emit light, based on the respective video signals. PDPs each divide a frame into subfields through quantization of the gray level and weighting, write information indicating switching ON or OFF in each subfield, and cause light emission in period dividing to thereby achieve almost the full display gray level. In order to further increase the display gray level, the width of presentation is increased by spatial division using a method such as error diffusion in some cases. At this time, it is possible to display a coded image by outputting the coded image for a period corresponding to one or more of the above-described subfields. In addition, it is also possible to display the coded image for the period by setting a period corresponding to a configuration other than a normal subframe configuration. In the case where only one-bit signals indicating 1 or 0 (a combination of black or white, or complementary colors such as R and cyan), at least one subframe of a short period is assigned to a period in which the coded image is displayed. In this way, it is possible to display the one-bit signals.

In the case of OLEDs, as in the case of PDPs, it is also possible to control light emission energy per unit time using a combination of weighted subframes and current that is flown to the elements corresponding to the primary parts of the pixels. For this reason, although it is also possible to adapt a subframe assigning method, it is desirable to set such a period in which the coded image is displayed. At this time, as a method for generating an image of the above-described one-bit signal, an image may be formed in terms of whether or not to apply current. However, it is also possible to form a coded image by applying another amount of current to make a difference in luminance, which makes it possible to select a period in which a coded image is displayed, with a comparatively high flexibility. At this time, in order to prevent recognition by human eyes, specifically, in order to satisfy a demand for decreasing the luminance by the coded image as much as possible and a demand for increasing the luminance at a moment depending on the sensitivity of an imaging element as much as possible, it is possible to, for example, display a coded image having a high luminance in an extremely short period.

Meanwhile, flat displays each having a microelectric mechanical system (MEMS), and projectors can be listed as display devices which are not self-emitting display devices similarly to general liquid crystal displays but require a light source such as a backlight. Furthermore, projectors are classified into projectors for displaying video by driving reflector elements corresponding to the respective pixels having DMDs at high speed, and projectors each having a liquid crystal. The displays having an MEMS are classified into general ones which have MEMS elements for the respective primary colors and display resulting video, and other ones which have MEMS elements corresponding in number to the pixels and display the respective primary colors by performing period dividing on a light source. It is considered that the latter case becomes general.

The former MEMSs are classified into ones which achieve a display gray level by controlling time in which light from the light source is transmitted according to PWM control simply, and the other ones which achieve a display gray level by controlling transparency or non-transparency for each subframe using gray level data obtained by dividing a frame into subframes weighted in the same manner as the PDPs and then quantized. Furthermore, it is also possible to achieve a display gray level having a wider range using a combination with change in luminance of the light source. In each of the display devices, in the same manner as the OLEDs, it is possible to transmit a coded image using each subframe, and thus it is also possible to form one coded image using a subframe. In the case of PWMs, it is also good to identify a period in which a coded image is displayed. Furthermore, in the case of a combination of luminance change, period dividing, or subframe control, it is also possible to control the luminance of a light source by achieving a display gray level using a parameter other than time, in the same manner as in control on the amount of current in the OLEDs. For this reason, depending on the intensity of light to be transmitted, it is also good to generate and transmit a coded image presenting a one-bit signal.

Projectors may perform control so that video projected on a screen is subject to period dividing and a coded image is formed in an extremely short period. This control method is described specifically.

The projectors having DMDs are classified into ones which perform period dividing on the respective primary colors, and the other ones which have DMDs arranged for the respective primary colors. The former ones can be driven by a driving configuration which is substantially the same as in the MEMSs. However, in the case of projectors, a coded image needs to be displayed in an image produced when projecting light reflected from the light source onto a screen. For this reason, equipment configurations are different, means for projecting a coded image onto a screen are considered to be suitable for each of devices used in a corresponding one of the control methods each of which uses a PWM, subframes, also involving intensity control of light from a light source, or using or involving these in combination. These control methods may be performed in all MEMSs in the same manner as in the case where light from a backlight is passed through the front surface. As for the latter ones, it is also good to increase the amount of signals (the number of bits) of a coded image by switching ON or OFF on a per primary color basis, and all of the primary colors are controlled at the same time, or a drive using inverse phases are performed at the same time. In this way, it is possible to project the coded image on the screen using black and white or two colors which have a complementary color relationship. As for projectors having a liquid crystal, it is possible to project a coded image onto a screen in the same manner as in the case of using a liquid crystal display.

Figure 19A:
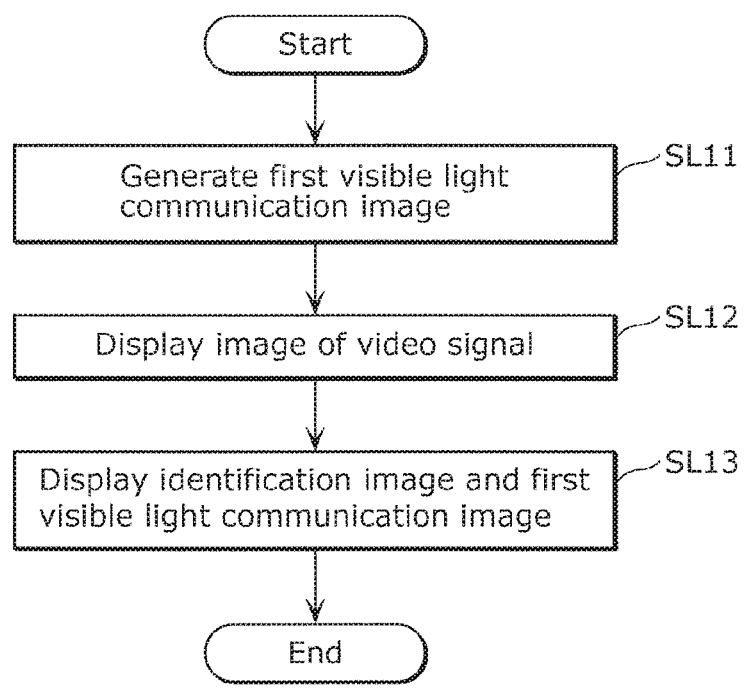
FIG. 19A is a flowchart of a display method according to an aspect of the present disclosure.

FIG. 19A is a flowchart of a display method according to an aspect of the present disclosure.

The display method according to the aspect of the present disclosure is a display method for displaying an image included in a video signal on a per frame basis, and includes Steps SL11 to SL13. In other words, the display method includes: a visible light communication image generating step SL11 for coding a visible light communication signal to generate a striped-pattern image for visible light communication as a first visible light communication image; a first display step SL12 for displaying an image included in the video signal in a predetermined frame; and a second display step SL13 for displaying, in the predetermined frame, an image having luminance that is uniformly lower than the average luminance in the image to be displayed, as an identification image, and sequentially displaying the first visible light communication image. In the second display Step SL13, after the image included in the video signal is displayed in the predetermined frame, each of the first identification image and the first visible light communication image is displayed in the same frame as the predetermined frame, for a period shorter than the predetermined frame.

Figure 19B:
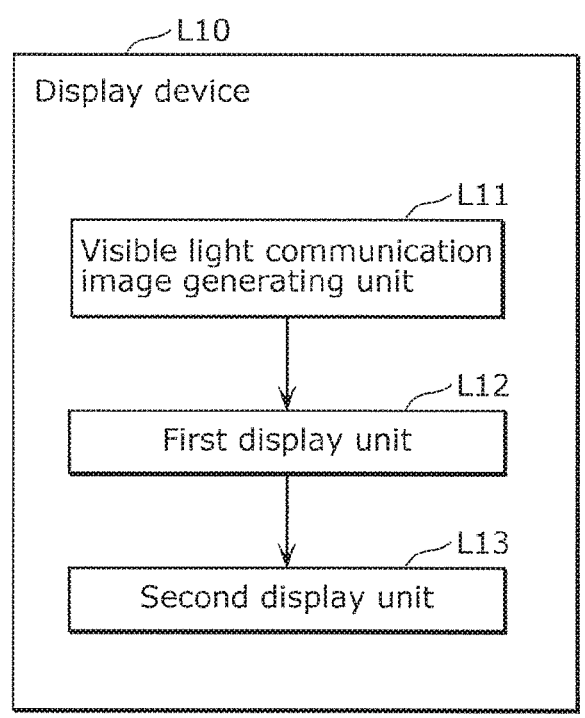
FIG. 19B is a block diagram of a display device according to an aspect of the present disclosure.

FIG. 19B is a block diagram of a display device according to an aspect of the present disclosure.

The display device L10 according to the aspect of the present disclosure is a display device which displays an image included in a video signal on a per frame basis, and includes constituent elements L11 to L13. Stated differently, the display device L10 includes: a visible light communication image generating unit L11 which codes a visible light communication signal to generate an image having a striped pattern for visible light communication as a first visible light communication image; a first display unit L12 which displays the image included in the video signal, in a predetermined frame; and a second display unit L13 which displays, in the predetermined frame, an image having luminance that is uniformly lower than the average luminance in the image to be displayed, as an identification image, and sequentially displaying the first visible light communication image. After the image included in the video signal is displayed in the predetermined frame, the second display unit L13 displays each of the first identification image and the first visible light communication image in the same frame as the predetermined frame, for a period shorter than the predetermined frame. It is to be noted that the visible light communication image generating unit L11 corresponds to, for example, the second signal processing unit 160 illustrated in FIG. 2. The first and second display units L12 and L13 correspond to, for example, the display control unit 140 and the display unit 110 illustrated in FIG. 2.

In the display method and the display device L10 illustrated in FIGS. 19A and 19B, a first visible light communication image is displayed, for example, after a full screen black image or a uniform gray image is displayed as an identification image. Thus, the imaged image obtained by imaging the image to be displayed on a per frame basis using an image sensor in rolling shutter mode includes uniform black or gray lines indicating the starting position of the visible light communication signal. Accordingly, it is possible to easily read the visible light communication signal from the imaged image. As a result, it is possible to appropriately transmit the visible light communication signal. In addition, since there is no need to blink the backlight for transmitting the visible light communication signal, it is possible to insert the visible light communication signal in the video and transmit the video without significantly reducing the image quality.

It is to be noted that each of the constituent elements in each of the above-described embodiments may be configured in the form of an exclusive hardware product, or may be realized by executing a software program suitable for the constituent element. Each of the constituent elements may be realized by means of a program executing unit such as a CPU or a processor, or reading and executing the software program recorded in a recording medium such as a hard disk or a semiconductor memory. For example, the program causes a computer to execute the display method indicated in the flowchart of FIG. 19A.

It is to be noted that these general and specific aspects of the present disclosure may be implemented using a system, a method, an integrated circuit, a computer program, or a computer-readable recording medium such as a CD-ROM, or any combination of systems, methods, integrated circuits, computer programs, and recording media.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The display method and the display device according to the present disclosure makes it possible to obtain information other than images safely and moreover actively. Accordingly, the display method and the display device are usable in various applications such as the transfer of image-attached information and information transmission in various scenes in a sense that such active properties allow necessary information to be safely obtained as much as needed from signage, information terminals, and information display devices outside, let alone devices such as television receivers, personal computers, and tablets in homes.

The invention claimed is:

1. A display method for displaying an image included in a video signal on a per frame basis, the display method comprising:
    a visible light communication image generating step of coding a visible light communication signal to generate an image having a striped pattern for visible light communication as a first visible light communication image;
    a frame dividing step of dividing a frame in which the image included in the video signal is displayed into a plurality of subframes including a first subframe, a second subframe following the first subframe and a third subframe following the second subframe;

a first display step of displaying the image included in the video signal, in the first subframe, wherein a time period in which the first visible light communication image is displayed in the one frame is within 0.2 milliseconds; and a second display step of displaying a low-luminance image in the second subframe, and displaying the first visible light communication image in the third subframe, the low-luminance image being an identification image and having uniform luminance lower than average luminance of the image which is included in the video signal and to be displayed, wherein in the second display step, after the image included in the video signal is displayed in the first subframe, the identification image is displayed for a period shorter than time in which one frame is displayed and, after the identification image is displayed, the first visible light communication image is displayed for a period shorter than time in which one frame is displayed.

2. The display method according to claim 1, further comprising a third display step of displaying an image having a striped pattern for visible light communication as a second visible light communication image after the first visible light communication image is displayed.

3. The display method according to claim 2,
wherein the second visible light communication image displayed in the third display step has a striped pattern different in direction from the striped pattern of the first visible light communication image.

4. The display method according to claim 2,
wherein the second visible light communication image displayed in the third display step is a complementary image obtained by switching two luminance values or two colors which are different from each other and form the striped pattern of the first visible light communication image.

5. The display method according to claim 4,
wherein each of the striped pattern of the first visible light communication image and the striped pattern of the second visible light communication image is formed using the two colors which have a complementary color relationship.

6. The display method according to claim 4,
wherein in the third display step, the first visible light communication image and the second visible light communication image are displayed in a same frame.

7. The display method according to claim 2, further comprising a first re-display step of re-displaying the identification image in a period from when the first visible light communication image is displayed to when the second visible light communication image is displayed.

8. The display method according to claim 7, further comprising
a second re-display step of re-displaying the identification image after the second visible light communication image is displayed.

9. The display method according to claim 7,
the identification image is re-displayed in a same frame.

10. The display method according to claim 1, wherein the identification image is one of an all black image and a uniformly gray image.

11. A display device which displays an image included in a video signal on a per frame basis, the display device comprising:
visible light communication image generating circuitry configured to code a visible light communication signal to generate an image having a striped pattern for visible light communication as a first visible light communication image;

a first display unit configured to divide a frame in which the image included in the video signal is displayed into a plurality of subframes including a first subframe, a second subframe following the first subframe and a third subframe following the second subframe, and display the image included in the video signal, in the first subframe, wherein a time period in which the first visible light communication image is displayed in the one frame is within 0.2 milliseconds; and a second display unit configured to display a low-luminance image in the second subframe, and displaying the first visible light communication image in the third subframe among the plurality of subframes, the low-luminance image being an identification image and having uniform luminance lower than average luminance of the image which is to be displayed, wherein after the image included in the video signal is displayed in the first subframe, the second display unit configured to display the identification image for a period shorter than time in which one frame is displayed and display, after the identification image is displayed, the first visible light communication image, for a period shorter than time in which one frame is displayed.

12. The display device according to claim 11, wherein the identification image is one of an all black image and a uniformly gray image.

* * * * *